(12) United States Patent
Breitenbach et al.

(10) Patent No.: US 9,092,768 B2
(45) Date of Patent: Jul. 28, 2015

(54) MACHINE RETROFITS AND INTERACTIVE SODA FOUNTAINS

(75) Inventors: Paul T. Breitenbach, Wilton, CT (US); Paul D. Signorelli, Ridgefield, CT (US); Igor Zhuk, Weston, CT (US)

(73) Assignee: R4 Technologies, LLC, Ridgefield, CT (US)

( * ) Notice: Subject to any disclaimer, the term of this patent is extended or adjusted under 35 U.S.C. 154(b) by 1083 days.

(21) Appl. No.: 13/004,860

(22) Filed: Jan. 11, 2011

(65) Prior Publication Data

US 2011/0168290 A1  Jul. 14, 2011

Related U.S. Application Data

(60) Provisional application No. 61/294,101, filed on Jan. 11, 2010, provisional application No. 61/331,208, filed on May 4, 2010.

(51) Int. Cl.
| | | |
|---|---|---|
| B65B 1/30 | (2006.01) | |
| G06Q 20/32 | (2012.01) | |
| B67D 7/14 | (2010.01) | |
| B67D 7/34 | (2010.01) | |
| G06Q 10/06 | (2012.01) | |
| G06Q 20/20 | (2012.01) | |
| G06Q 30/02 | (2012.01) | |
| G06Q 30/06 | (2012.01) | |
| G07F 13/06 | (2006.01) | |

(52) U.S. Cl.
CPC ............ *G06Q 20/32* (2013.01); *B67D 7/145* (2013.01); *B67D 7/348* (2013.01); *G06Q 10/06311* (2013.01); *G06Q 20/20* (2013.01); *G06Q 30/0277* (2013.01); *G06Q 30/0601* (2013.01); *G06Q 30/0613* (2013.01); *G06Q 30/0639* (2013.01); *G07F 13/065* (2013.01)

(58) Field of Classification Search
CPC ............................. B67D 7/348; B67D 7/145
USPC ................................................. 141/1, 94
See application file for complete search history.

(56) References Cited

U.S. PATENT DOCUMENTS

| | | | | |
|---|---|---|---|---|
| 4,951,719 A | * | 8/1990 | Wiley et al. | 141/1 |
| 5,058,630 A | * | 10/1991 | Wiley et al. | 141/1 |
| 5,074,341 A | * | 12/1991 | Credle et al. | 141/1 |
| 6,354,342 B1 | * | 3/2002 | Gagliano | 141/94 |

* cited by examiner

*Primary Examiner* — Jason K Niesz
(74) *Attorney, Agent, or Firm* — Fincham Downs, LLC; Carson C.K. Fincham

(57) ABSTRACT

Systems, apparatus, methods, and articles of manufacture for machine retrofits and interactive soda fountains are provided.

1 Claim, 10 Drawing Sheets

US 9,092,768 B2

MACHINE RETROFITS AND INTERACTIVE SODA FOUNTAINS

CROSS-REFERENCE TO RELATED APPLICATIONS

The present application claims benefit and priority under 35 U.S.C. §119(e) to (i) U.S. Provisional Patent Application Ser. No. 61/294,101, filed on Jan. 11, 2010, and titled "VENDING MACHINE SYSTEMS AND METHODS", and (ii) U.S. Provisional Patent Application Ser. No. 61/331,208, filed on May 4, 2010, and titled "EVENT SALES AND DISTRIBUTION SYSTEMS AND METHODS". Each of the above-referenced applications is hereby incorporated by reference herein.

MASK WORK NOTICE

A portion of the disclosure of this patent document contains material which is subject to mask work protection. The mask work owner has no objection to the facsimile reproduction by any-one of the patent document or the patent disclosure, as it appears in the Patent and Trademark Office patent file or records, but otherwise reserves all mask work rights whatsoever.

BACKGROUND

Restaurants, entertainment venues, and other establishments and/or areas typically utilize machines to facilitate the offering of beverages (and/or other refreshments). Such machines often include vending machines, visi-coolers, or soda fountains. Each different type of machine offers different advantages and disadvantages. Vending machines, for example, double as Point-Of-Sale (POS) devices, allowing them to function in a predominately autonomous fashion, but with the added expense of the requisite POS hardware and/or electronics. Visi-coolers allow customers to choose which product they want and allow self-service access to the desired product(s) (relieving store personnel of the duty to retrieve products for customers), but only allow pre-packaged items of limited sizes to be displayed. Soda fountains allow customers full flexibility of customization (e.g., amount, mix, ice content, and/or seltzer content), but are limited to typically five (5) or six (6) different beverage types. While advances in vending machine technology have leveraged expensive hardware and software to provide increased functionality (such as credit card payment acceptance) in new machines, older vending machines, visi-coolers, and soda fountains remain hindered by their original capabilities.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
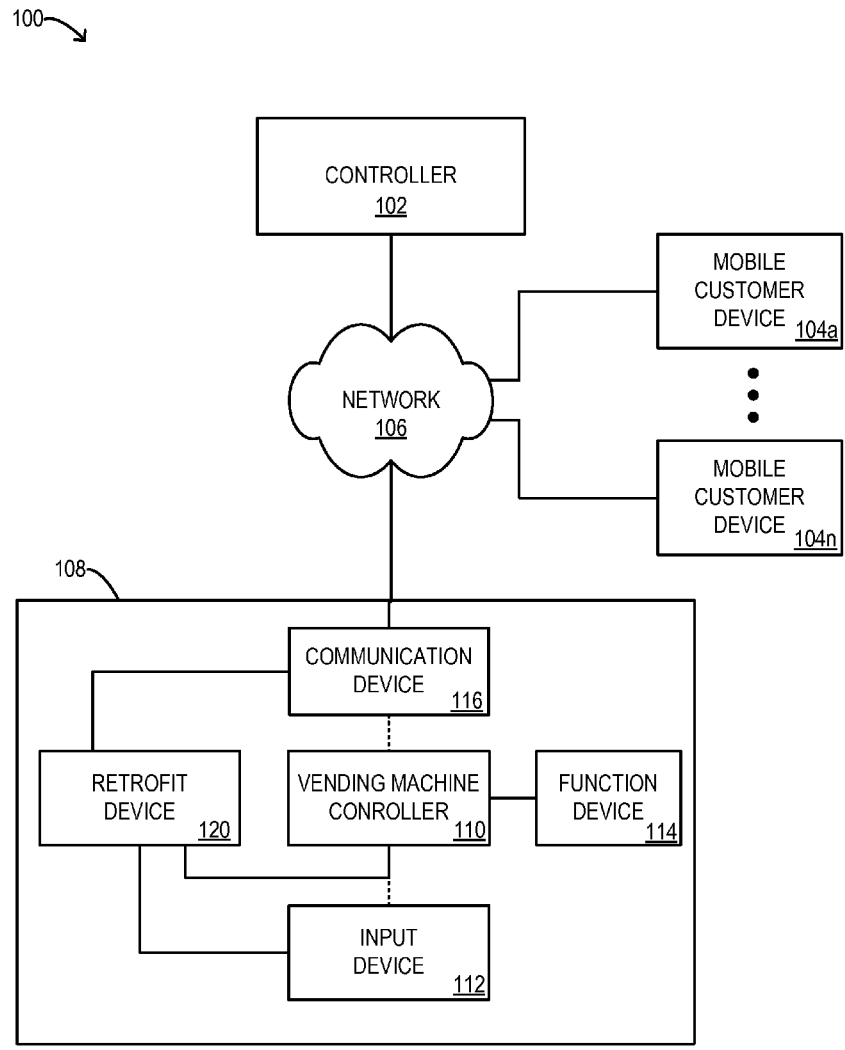
FIG. 1 is a block diagram of a system according to some embodiments.

Embodiments presented herein are descriptive of systems, apparatus, methods, and articles of manufacture for machine retrofits and for interactive fountains. In some embodiments, for example, a retrofit device may be coupled to a conventional vending machine, visi-cooler, and/or soda fountain to facilitate remote, wireless, cashless, and/or account-based sales. According to some embodiments, the retrofit device may allow customers to utilize a variety of enhanced services via what would otherwise be standard machines.

According to some embodiments, for example, methods may include (i) intercepting (e.g., by a retrofit device coupled to a machine) an input signal from an input device of a machine, (ii) transmitting (e.g., by the retrofit device and/or to a remote electronic processing device) an indication of the intercepted input, (iii) receiving (e.g., in response to the transmitting of the indication of the intercepted input, by the retrofit device, and/or from the remote electronic processing device) an indication of a desired function to be activated at the machine in response to the input signal, and/or (iv) causing (e.g., via the retrofit device and/or based on the indication of the desired function of the machine) the machine to execute the desired function.

In some embodiments, methods may include (i) receiving, by a retrofit device of a soda fountain and from at least one of a mobile customer device and a remote processing device, an indication of a desired dispensing of a beverage available at the soda fountain, (ii) confirming that a beverage container is positioned beneath an appropriate fountain head of the soda fountain, and/or transmitting, after the confirming and by the retrofit device and in response to the receiving, a signal to at least one component of the soda fountain, wherein the transmitting causes the appropriate fountain head to dispense an appropriate quantity of the desired beverage.

II. Terms and Definitions

Some embodiments described herein are associated with a "retrofit device". As used herein the term "retrofit device" may generally refer to any type, quantity, and/or configuration of device that is capable of and/or specifically programmed or configured to perform or facilitate actions, procedures, processes, and/or methods in accordance with embodiments described herein. In some embodiments, a retrofit device may comprise a device that is added to a standard machine (e.g., as a post-production and/or after-market add-on) to add to and/or alter functionality thereof—e.g., an "after-market" retrofit device. According to some embodiments, a retrofit device may comprise a device coupled to a machine at the time of manufacture where such device adds to and/or alters the functionality of the manufactured machine as described herein—e.g., an Original Equipment Manufacturer (OEM) retrofit device.

Some embodiments described herein are associated with a "customer device" or a "network device". As used herein, a "customer device" is a subset of a "network device". The "network device", for example, may generally refer to any device that can communicate via a network, while the "customer device" may comprise a network device that is owned or operated by or otherwise associated with a customer. Examples of customer and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Customer and/or network devices may comprise one or more network components.

As used herein, the term "network component" may refer to a customer and/or network device, or a component, piece, portion, or combination of customer and/or network devices. Examples of network components may include, but are not limited to: a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

III. Retrofit Device

A. System Overview

Referring first to FIG. 1, a block diagram of a system 100 according to some embodiments is shown. In some embodiments, the system 100 may comprise a controller 102 in communication with one or more mobile customer devices 104a-n (e.g., via a network 106). According to some embodiments, the system 100 may comprise a machine 108. In some embodiments, the machine 108 may comprise a Vending Machine Controller (VMC) 110, an input device 112, a function device 114, and/or a communication device 116. The machine 108 may, for example, receive input via the input device 112 and process the input via the VMC 110 which then activates the function device 114 in accordance with the input. In some embodiments, the machine 108 may be in communication with the network 106 (and/or the controller 102 and/or any or all of the mobile customer devices 104a-n). According to some embodiments, the system 100 and/or the machine 108 may comprise a retrofit device 120. The retrofit device 120 may, for example, cause the machine 108 to operate in accordance with embodiments described herein.

In some embodiments, the controller 102 may comprise an electronic and/or computerized controller device such as a computer server communicatively coupled to interface with the mobile customer devices 104a-n (directly and/or indirectly). The controller 102 may, for example, comprise a PowerEdge™ M910 blade server manufactured by Dell®, Inc. of Round Rock, Tex. which may include one or more Eight-Core Intel® Xeon® 7500 Series electronic processing devices. According to some embodiments, the controller 102 may be located remote from a location of the machine 108, such as at one or more centralized locations. The controller 102 may also or alternatively comprise a plurality of electronic processing devices located at one or more various sites such as at the location of the machine 108 and/or at one or more other locations remote from the location of the machine 108.

According to some embodiments, the controller 102 may store and/or execute specially programmed instructions to operate in accordance with embodiments described herein. The controller 102 may, for example, execute one or more programs that (e.g., in conjunction with the retrofit device 120) permit a customer (not explicitly shown in FIG. 1) of the machine 108 (e.g., operating a mobile customer device 104a-n) to place purchase orders for products (and/or services) available at the machine 108.

The mobile customer devices 104a-n, in some embodiments, may comprise any type or configuration of mobile electronic network and/or communication device that is or becomes known or practicable. The mobile customer devices 104a-n may, for example, comprise one or more cellular and/or wireless telephones such as an iPhone® manufactured by Apple®, Inc. of Cupertino, Calif. or an Optimus™ S smartphone manufactured by LG® Electronics, Inc. of San Diego, Calif., and running an Androird® operating system from Google®, Inc. of Mountain View, Calif. In some embodiments, a first mobile customer device 104a may be utilized by a first customer while the first customer (and thus the first mobile customer device 104a) is located at and/or near the location of the machine 108. The first customer may utilize and/or operate the first mobile customer device 104*a* while adjacent to (or in the same building as) the machine 108, for example, to purchase products and/or services available for sale at (or via) the machine 108. In some embodiments, another customer (also not shown) operating another mobile customer device 104*n* may interact with the machine 108 while being remote there from.

The mobile customer devices 104*a-n* may, for example, communicate with the controller 102 via the network 106 to effectuate an order and/or sale of one or more products and/or services. The network 106 may, according to some embodiments, comprise a LAN (wireless and/or wired), cellular telephone, Bluetooth®, and/or RF network with communication links between the controller 102 and any or all of the mobile customer devices 104*a-n*. In some embodiments, the network 106 may comprise direct communications links between any or all of the components 102, 104*a-n*, 108, 110, 112, 114, 116, 120 of the system 100. The mobile customer devices 104*a-n* may, for example, be directly interfaced or connected to the machine 108 via one or more wires, cables, wireless links, and/or other network components, such network components (e.g., communication links) comprising portions of the network 106. In some embodiments, the network 106 may comprise one or many other links or network components other than those depicted in FIG. 1. Any or all of the mobile customer devices 104*a-n* may, for example, be connected to the controller 102 via various cell towers, routers, repeaters, ports, switches, and/or other network components that comprise the Internet and/or a cellular telephone (and/or Public Switched Telephone Network (PSTN)) network, and which comprise portions of the network 106.

While the network 106 is depicted in FIG. 1 as a single object, the network 106 may comprise any number, type, and/or configuration of networks that is or becomes known or practicable. According to some embodiments, the network 106 may comprise a conglomeration of different sub-networks and/or network components interconnected, directly or indirectly, by the components 102, 104*a-n*, 108, 110, 112, 114, 116, 120 of the system 100. The network 106 may comprise one or more cellular telephone networks with communication links between the mobile customer devices 104*a-n*, the controller 102, and/or the machine 108, for example, and/or may comprise the Internet, with communication links between the controller 102 and the machine 108 (and/or the communication device 116 thereof), for example.

In some embodiments, the machine 108 may comprise any type or configuration of mechanical, electrical, and/or electro-mechanical device or system that is or becomes known or desirable. The machine 108 may, for example, comprise a vending machine, a visi-cooler (and/or a standard cooler, refrigerator, freezer, warmer, and/or oven), and/or a soda fountain. In some embodiments, the machine 108 may be associated with and/or capable of initiating and/or conducting certain functions standard to the machine 108 (e.g., dispensing a product in the case of a vending machine or allowing the opening of a temperature-controlled product storage area in the case of a visi-cooler). According to some embodiments, the coupling of the retrofit device 120 to the machine 108 (and/or portions or components thereof) may alter the standard functionality of the machine 108 (such as by adding additional functionality and/or changing standard functionality).

According to some embodiments, the VMC 110 of the machine 108 may be or include any type, quantity, and/or configuration of electronic and/or computerized processor that is or becomes known. While the term "VMC" is utilized for exemplary purposes to describe the processing device and/or functionality of the machine 108, the utilization of the term does not imply that the machine 108 necessarily comprises a vending machine. As described herein, other types of machines 108 and/or processing devices are contemplated to be within the scope of some embodiments.

In some embodiments, the VMC 110 may comprise an Intel® IXP 2800 network processor or an Intel® XEON™ Processor coupled with an Intel® E7501 chipset, available from Intel® Corporation of Santa Clara, Calif. In some embodiments, the VMC 110 may comprise an electronic processor such as an Intel® Core™ 2 Duo P8600 CPU also available from Intel® Corporation of Santa Clara, Calif. In some embodiments, the VMC 110 may execute instructions, such as instructions specially programmed into and/or for the VMC 110. The execution of the specially-programmed instructions may, for example, enable and/or facilitate the machine 108 to operate in accordance with standard functionality of the machine 108.

In some embodiments, the VMC 110 may comprise multiple inter-connected processors, microprocessors, and/or micro-engines. According to some embodiments, the VMC 110 (and/or the machine 108 and/or other components thereof) may be supplied power via a power supply (not shown) such as a battery, an AC source, a DC source, an AC/DC adapter, solar cells, and/or an inertial generator. In the case that the machine 108 comprises a vending machine, visi-cooler, and/or soda fountain, necessary power may be supplied via a standard AC outlet, power strip, surge protector, and/or UPS device.

According to some embodiments, the input device 112 of the machine 108 may comprise a keypad, keyboard, one or more buttons, and/or a touch screen interface. The input device 112 may be utilized, by a customer for example, to enter product (and/or service) selections, payment information, etc. In some embodiments, the input device 112 may be coupled to provide instructions to the function device 114. The function device 114 may, for example, comprise a vending and/or dispensing mechanism or a payment acceptance mechanism (e.g., in the case that the machine 108 comprises a vending machine), a door and/or door lock or latch (e.g., in the case that the machine 108 comprises a visi-cooler), and/or a valve (e.g., in the case that the machine 108 comprises a soda fountain).

In some embodiments, the function device 114 may comprise an electronic processing device coupled to receive commands from the VMC 110 and/or input from the input device 112, to execute specially-programmed instructions, and/or to send commands to another portion or part of the function device 114 and/or the machine 108 (e.g., based on the input). In some embodiments, the machine 108 may communicate via the communication device 116 (e.g., upon command by the VMC 110) with an external and/or remote device such as the controller 102. In the case that the machine 108 comprises a more advanced vending machine, for example, the machine 108 may accept credit card payment via the input device 112 and may utilize the communication device 116 to verify, put a hold on, and/or charge a customer's credit card. The controller 102 may, in such embodiments, comprise a credit card processing device, server, clearing house, credit card network, and/or financial institution device.

According to some embodiments, the communication device 116 may comprise any type or configuration of communication device that is or becomes known or practicable. The communication device 116 may, for example, comprise a NIC, a telephonic device, a cellular network device, a router, a hub, a modem, and/or a communications port or cable. In some embodiments, the communication device 116 may be coupled to provide data to a central controller and/or to mobile customer devices, such as in the case that the machine 108 is utilized by a customer to conduct product and/or service purchases and/or social networking via a customer's wireless and/or mobile device. According to some embodiments, the communication device 116 may also or alternatively be coupled to the VMC 110. In some embodiments, the communication device 116 may comprise an IR, RF, Bluetooth™, and/or Wi-Fi® network device coupled to facilitate communications between the VMC 110 and/or the retrofit device 120 (and/or the machine 108) and another device (such as the controller 102 and/or the mobile customer devices 104*a-n*).

In some embodiments, the retrofit device 120 may comprise any type or configuration of device coupled to allow transactions (and/or other functions) to occur at the machine 108 via the controller 102, the mobile customer devices 104*a-n*, and/or via the input device 112 in a manner not typically accepted by the machine 108. Any or all of the mobile customer devices 104*a-n* may interface with the controller 102, such as a web server for example, to place an order (and/or request another desired function) at the machine 108 by having the controller 102 communicate with the retrofit device 120 (e.g., via the communication device 116). In some embodiments, a first customer device 104*a* may communicate directly with the retrofit device 120 (e.g., via the communication device 116) to place an order and/or request a function to be performed by the machine 108. In some embodiments, a customer interfacing with the input device 112 may summon, invoke, and/or communicate with the controller 102 via the retrofit device 120 to cause functioning of the machine 108 that is not typically and/or otherwise possible at the machine 108 (e.g., in the absence of the retrofit device 120).

B. Methods

Figure 2:
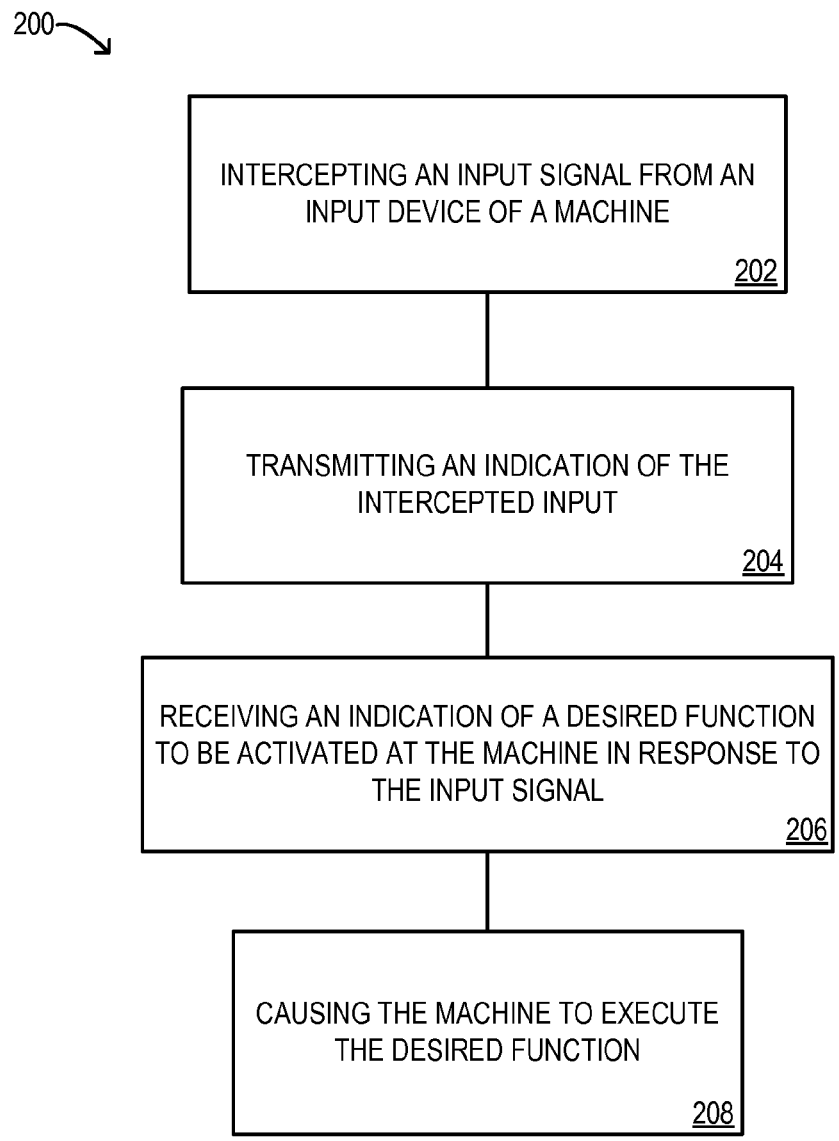
FIG. 2 is a flow diagram of a method according to some embodiments.

Turning to FIG. 2, a flow diagram of a method 200 according to some embodiments is shown. In some embodiments, the method 200 may be performed and/or implemented by and/or otherwise associated with one or more specialized computerized processing devices (e.g., the controller 102, the VMC 110, and/or the retrofit device 120 of FIG. 1), specialized computers, computer terminals, computer servers, computer systems and/or networks (e.g., the network 106 of FIG. 1), and/or any combinations thereof. The functional diagrams and flow diagrams described herein do not necessarily imply a fixed order to any depicted actions, steps, and/or procedures, and embodiments may generally be performed in any order that is practicable unless otherwise and specifically noted. Any of the processes and methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

In some embodiments, the method 200 may comprise intercepting an input signal from an input device of a machine, at 202. A retrofit device (such as the retrofit device 120 of FIG. 1) may, for example, be coupled to receive, intercept, interrupt, and/or otherwise determine input entered into (and/or via) a machine (e.g., input entered by a customer and/or operator into the input device 112 of the machine 108 of FIG. 1). According to some embodiments, an interception of such input may comprise a rerouting of input signals originally sent from an input device to another device (e.g., the function device 114 of FIG. 1) in the machine. In some embodiments, the intercepted (and/or otherwise determined) input may cause the retrofit device to take certain actions and/or initiate certain sequences and/or procedures. Input directed to standard functions of the machine, for example, may simply be routed to the appropriate portion, component, and/or original destination in the machine, while input directed to cause the machine to perform a non-standard function (e.g., to accept payment from a centralized account such as a credit card and/or other account), for example, may cause the retrofit device to initiate communications with an external and/or remote device.

According to some embodiments, the method 200 may comprise transmitting an indication of the intercepted input, at 204. The retrofit device may, for example, cause a communication device (e.g., the communication device 116 of FIG. 1) to send a signal indicative of the input to a device (e.g., an electronic processing device) or system external and/or remote from the machine (such as the controller 102 of FIG. 1). In some embodiments for example, such as in the case that the input comprises a request to utilize a stored-value account to purchase products and/or services from the machine—e.g., a function which is not standard to the machine—the retrofit device may send a payment authorization request to a central controller associated with the stored-value account. In such a manner, for example, a customer may utilize a standard machine equipped with the retrofit device to conduct transactions that would otherwise not be possible.

In some embodiments, the method 200 may comprise receiving an indication of a desired function to be activated at the machine in response to the input signal, at 206. According to some embodiments, the indication of the desired function may be received in response to the transmitting of the indication of the desired input. Specially-programmed instructions stored and/or executed by the controller may, for example, be executed to determine an appropriate action to be taken at the machine in response to the customer's input. In some embodiments, the appropriate response may be to dispense and/or provide a product desired by the customer for which electronic payment has been verified by the controller. In some embodiments, the appropriate response may be to alter a state of the machine, display and/or otherwise output certain information via the machine, and/or allow access to electronic content such as songs, other digital files, and/or the Internet itself.

According to some embodiments, the method 200 may comprise causing the machine to execute the desired function, at 208. The retrofit device may, based on the received indication of the desired function for example, send a signal to the machine (e.g., to the VMC 110 and/or the function device 114 of FIG. 1) that causes the machine to undertake the desired function. In the case that the desired function is the dispensing and/or providing of a unit of product, for example, the retrofit device may transmit a signal that causes the machine to dispense the desired unit of product—such as by sending a signal indicative of payment to a payment acceptance device of the machine. The retrofit device may, in some embodiments, "fool" the machine by replicating a "coin-in" signal indicative of the proper payment amount for the desired unit of product, causing the machine to dispense the unit of product.

In some embodiments, the retrofit device may replicate all input signals sent to the machine for a particular transaction. The customer may not, according to some embodiments for example, enter the input indicative of a desired unit of product into the input device (e.g., the input device 112 of FIG. 1) but instead enter the input via a customer device (such as one of the mobile customer devices 104a-n of FIG. 1). In such embodiments, the retrofit device may cause the machine to function as desired by replicating the remotely and/or externally-received inputs (directly from the customer device and/or via the controller) as input signals such as would be generated had the inputs been received via the standard input device of the machine.

In some embodiments, such as in the case that the retrofit device and/or central controller device do not store and/or otherwise have direct access to prices of products and/or services available at (and/or via) the machine, the method 200 may comprise obtaining price data by querying the machine. The retrofit device may, for example, poll the machine and/or otherwise send a request to the machine to gather data regarding prices. In some embodiments, the polling may comprise querying a database of prices utilizing the Digital Exchange (DEX) protocol and/or capabilities of the machine. According to some embodiments, the retrofit device may transmit a purchase request to the VMC (e.g., via DEX) utilizing a "phantom" dollar amount (e.g., five dollars ($5)) for the purchase of a specific product and/or service. The VMC may return an amount of change due based on the "phantom" dollar amount and the actual price of the product and/or service, from which the retrofit device may discern the actual price of the product (e.g., by subtracting the change due from the "phantom" dollar amount).

C. Apparatus

Figure 3:
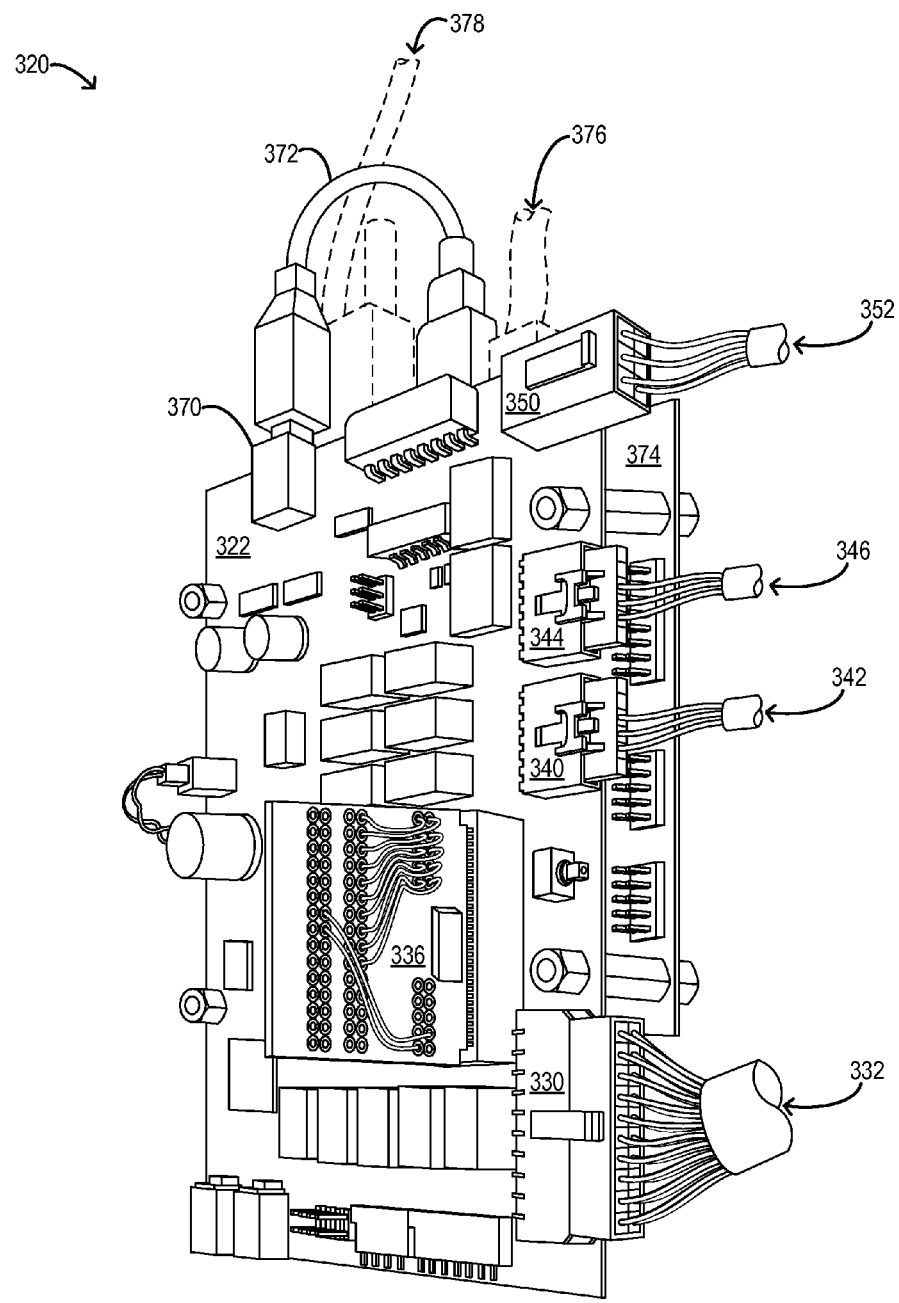
FIG. 3 is a perspective diagram of an apparatus according to some embodiments.

Turning to FIG. 3, a block diagram of an apparatus 320 according to some embodiments is shown. In some embodiments, the apparatus 320 may be similar in configuration and/or functionality to the retrofit device 120 described in conjunction with FIG. 1 herein. The apparatus 320 may, for example, execute, process, facilitate, and/or otherwise be associated with the method 200 of FIG. 2 herein. In some embodiments, the apparatus 320 may comprise a Printed Circuit Board (PCB) 322 (and/or other type of circuit structure) upon which various electric components and/or traces are provided and/or upon which various connectors to other components and/or devices are provided. In some embodiments, for example, the PCB 322 may comprise (i) a keypad connector 330 via which a keypad cable 332 may be connected and/or via which communication with a "personality board" 336 may be obtained, a (ii) a first DEX connector 340 via which a first DEX cable 342 may be connected, (iii) a second DEX connector 344 via which a second DEX cable 346 may be connected, (iv) a Multi-Drop Bus (MDB) connector 350 via which an MDB cable 352 may be connected, and/or (v) a Universal Serial Bus (USB) connector 370 via which a USB cable 372 may be connected. In some embodiments, the USB cable 372 may also connect to an electronic processing device 374. Fewer or more components and/or various configurations of the components 322, 330, 332, 340, 342, 344, 346, 350, 352, 370, 372, 374 may be included in the apparatus 320 without deviating from the scope of embodiments described herein.

According to some embodiments, the keypad connector 330 may receive, via the keypad cable 332, indications of input entered via an input device of a machine (e.g., the input device 112 of the machine 108 of FIG. 1). While the term "keypad" is utilized to describe both the keypad connector 330 and the keypad cable 332 for convenience, this term is utilized merely as an example of one type of input device via which such input may be received. In some embodiments, the keypad connector 330 and/or the keypad cable 332 may intercept and/or otherwise obtain the input from the input device, such as described with respect to the procedure at 202 of the method 200 of FIG. 2. According to some embodiments, the keypad connector 330 and/or keypad cable 332 may comprise a standard and/or universal wiring arrangement capable of receiving input signals from input devices. In some embodiments, such as in the case that different types, configurations, models, and/or serial numbers of machines utilize different wiring arrangements, the keypad connector 330 may interface with and/or otherwise be in communication with the "personality board" 336.

As shown in FIG. 3, the "personality board" 336 may comprise an add-on module, component, and/or daughterboard coupled to the PCB 322. In some embodiments, the personality board 336 may comprise a PCB that is pre-configured with specific wiring mappings which convert the standard and/or universal wiring arrangement of the keypad connector 330 and/or keypad cable 332 to mappings specific to certain types and/or configurations of machines. In such a manner, for example, different personality boards 336 may be simply coupled to the PCB 322 to configure the apparatus 320 to function properly in different types of machines. According to some embodiments, the keypad connector 330 and/or keypad cable 322 may transmit input data and/or indications or replications of input data. Input received by the keypad connector 330 and/or keypad cable 322 may, for example, be forwarded, passed-through, and/or re-transmitted via the keypad connector 330 and/or keypad cable 322, such as to a VMC or other electronic processing device. In some embodiments, the keypad connector 330 and/or keypad cable 322 may transmit emulated and/or replicated input signals (e.g., based on indications received from external and/or remote devices) to other devices such as a VMC or other electronic processing device. In such a manner, for example, external commands may be received and sent via the apparatus 320 to a machine to cause initiation of desired functionality by emulating signals representing possible inputs received directly by the machine (e.g., from a user or customer). In some embodiments, such as in the case that the emulated signals are descriptive of input an operator may normally provide to the machine, the apparatus 320 may be utilized to cause operator-type functionality at the machine such as unlocking a door or cabinet, changing machine settings (e.g., environmental and/or energy controls), and/or setting or changing prices at the machine.

According to some embodiments, the first DEX connector 340 may be utilized to send and/or received machine data via the first DEX cable 342. The first DEX cable 342 may, for example, be connected to a DEX port (not shown in FIG. 3) of a VMC and/or other machine or component thereof. The term "DEX" is utilized as an example connection and/or protocol via which the apparatus 320 may interface with a processing device and/or data storage device of a machine. Other connectors, connections, and/or cable types are contemplated to be within the scope of some embodiments. In some embodiments, the first DEX connector 340 may be utilized to poll and/or query a machine to determine various sales information such as prices, costs, sales data, sales goals, inventory, etc. The DEX connector 340 may, for example, be utilized to develop real-time sales data at the machine by periodic polling (e.g., every few minutes) of the machine. In such a manner, real-time sales data may be utilized (e.g., by the apparatus 320 and/or otherwise by the machine) to execute decision making processes such as deciding what promotions to offer and/or how to set or change prices at the machine. In some embodiments, the second DEX connector 344 may send and/or or receive data via the second DEX cable 346. The second DEX connector 344 may be utilized, for example, to interface with a mobile DEX device (not shown in FIG. 3) of a machine owner, operator, service technician, and/or route driver. In some embodiments, the DEX connectors 340, 344 may act as a pass-through for an operator's mobile DEX-enabled device to permit standard queries to a VMC and/or other machine electronic processing device.

In some embodiments, the MDB connector 350 may be connected to a VMC and/or other electronic processing device (not shown in FIG. 3) via the MDB cable 352 such that the apparatus may function as an MDB peripheral to the machine to which it is coupled. According to some embodiments, the apparatus 320 may receive power (some or all required operational power) via the MDB connector 350 and MDB cable 352. In some embodiments, the MDB connector 350 and MDB cable 352 may be utilized to cause a vending or dispensing of a product at a machine (or otherwise cause a function at the machine to be executed) by causing a credit to be established at the machine. In some embodiments, this may be accomplished without "knowledge" of and/or direct access to actual prices for products and/or services available at the machine. The apparatus 320 may, for example, transmit a credit signal for a specific monetary amount via the MDB connector 350 and MDB cable 352 to the machine, along with an identifier of a product and/or service desired for purchase. In some embodiments, the credit signal may comprise a small monetary amount such as five cents ($0.05), such that transmittal of the amount is likely to be too low to purchase any available product or service from the machine. In response to the credit signal representing the small monetary amount, the machine may transmit and the apparatus 320 may receive, an indication of an amount by which the credited funds are deficient for the purchase of the desired product and/or service. The apparatus 320 may then, for example, utilize the received information descriptive of the deficiency amount to calculate the actual price of the desired product and/or service. In some embodiments, the apparatus 320 may then transmit a second credit signal to the machine (e.g., via the MDB connector 350 and MDB cable 352) representing the determined actual price, such that the machine may be caused to provide the desired product and/or service in response thereto. In such a manner, the apparatus 320 may be coupled to a variety of different machines having various pricing implemented thereon, without the need for the apparatus 320 to be specifically configured, programmed, and/or otherwise privy to actual prices for products and/or services. In other words, the apparatus 320 may utilize the MDB connector 350 and MDB cable 352 to "ping" the machine to derive any desired actual price metrics. In some embodiments, such a "ping" procedure may be utilized to verify that prices at the machine are set as desired (e.g., as desired by an operator of the machine)—e.g., to verify that there are no discrepancies in pricing strategies.

According to some embodiments, the USB connector 370 may, via the USB cable 372, couple the PCB 322 to the electronic processing device 374. While the term "USB" is utilized as an example type of connection and/or protocol via which the PCB 322 and the electronic processing device 374 may interface, other types and/or configurations of connectors and/or protocols are contemplated in some embodiments. In some embodiments, the electronic processing device 374 may communicate with the PCB 322 to receive indications of input (e.g., from the keypad connector 330 and/or from an external device or source) and/or provide instructions or commands to (and/or through) the PCB 322. The electronic processing device 374 may store and/or execute specially-programmed instructions, for example, that trigger certain signal transmissions from the PCB 322 based on input and/or other data obtained by the PCB 322.

In some embodiments, the electronic processing device 374 may be or include any type, quantity, and/or configuration of electronic and/or computerized processor that is or becomes known. The electronic processing device 374 may comprise, for example, a TS-7200™ Single Board Computer (SBC) based upon a Cirrus® EP9302 ARM9 CPU, available from Technologic Systems, of Fountain Hills, Ariz. In some embodiments, the electronic processing device 374 may execute instructions, such as instructions specially programmed into and/or for the electronic processing device 374. The execution of the specially-programmed instructions may, for example, enable and/or facilitate the apparatus 320 to operate in accordance with embodiments as described herein (e.g., in accordance with the method 200 of FIG. 2).

In some embodiments, the electronic processing device 374 may comprise multiple inter-connected processors, microprocessors, and/or micro-engines. According to some embodiments, the electronic processing device 374 (and/or the apparatus 320 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 320 comprises a retrofit device coupled to an AC-powered machine, necessary power may be supplied via a standard AC outlet, power strip, surge protector, and/or Uninterruptible Power Supply (UPS) device (e.g., and/or via the MDB connector 350 as described herein).

While the apparatus 320 is described with reference to specific quantities and types of components 322, 330, 332, 340, 342, 344, 346, 350, 352, 370, 372, 374, 376, 378, variations in the quantities, types, and/or configurations of the components 322, 330, 332, 340, 342, 344, 346, 350, 352, 370, 372, 374, 376, 378 of the apparatus 320 may be implemented without deviating from the scope of the embodiments described herein.

D. Systems

Figure 4:
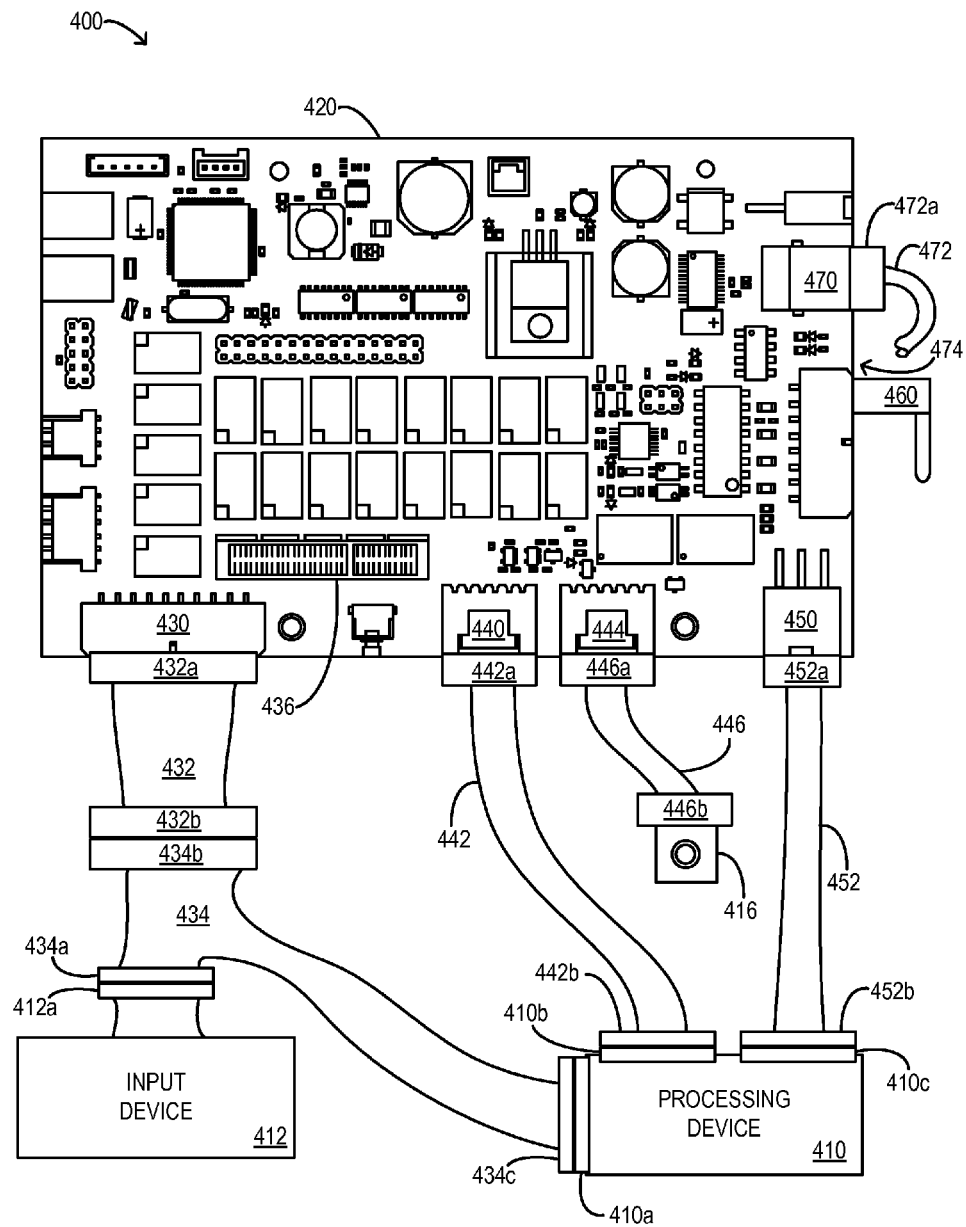
FIG. 4 is a block diagram of a system according to some embodiments.

Turning to FIG. 4, a block diagram of a system 400 according to some embodiments is shown. In some embodiments, the system 400 may be similar in configuration and/or functionality to the system 100 described in conjunction with FIG. 1 herein. The system 400 may, for example, execute, process, facilitate, and/or otherwise be associated with the method 200 of FIG. 2 herein. In some embodiments, the system 400 may comprise a processing device 410 (e.g., having a first processor connection port 410a, a second processor communication port 410b, and/or a third processor communication port 410c), an input device 412 (e.g., having a first input connector 412a), a communication device 416, and/or a retrofit device 420. In some embodiments, the retrofit device 420 may comprise an input port 430 coupled to a primary input cable 432 (e.g., having a first primary input connector 432a and/or a second primary input connector 432b). According to some embodiments, the primary input cable 432 may be coupled to the input device 412 and/or to the processing device 410 via an input "Y" harness 434 (e.g., having a first input harness connector 434a, a second input harness connector 434b, and/or a third input harness connector 434c). In some embodiments, the retrofit device 420 may comprise an input mapping connector 436 in communication with the input port 430.

In some embodiments, the retrofit device 420 may comprise a first data management port 440 coupled to the processing device 410 via a data management cable 442 (e.g., having a first data management connector 442a and/or a second data management connector 442b) and/or a second data management port 444 coupled to the communication device 416 via a data interface cable 446 (e.g., having a first data interface connector 446a and/or a second data interface connector 446b). According to some embodiments, the retrofit device 420 may comprise a payment port 450 coupled to the processing device 410 via a payment cable 452 (e.g., having a first payment connector 452a and/or a second payment connector 452b) and/or a retrofit communication device 460. In some embodiments, the retrofit device 420 may comprise a retrofit processing port 470 coupled via a processing cable 472 to a retrofit processing device 474 (not visible in the embodiment and view depicted in FIG. 4). In some embodiments, the components 410, 412, 416, 420, 430, 432, 434, 436, 440, 442, 444, 446, 450, 452, 460, 470, 472, 474 of the system 400 may be similar and/or equivalent to the similarly named and/or numbered components described with respect to the system 100 of FIG. 1 and/or the apparatus 320 of FIG. 3 herein. Fewer or more components and/or various configurations of the components 410, 412, 416, 420, 430, 432, 434, 436, 440, 442, 444, 446, 450, 452, 460, 470, 472, 474 may be included in the system 400 without deviating from the scope of embodiments described herein.

In some embodiments, data received by the input device 412 may be intercepted, split, and/or diverted utilizing the input "Y" harness 434. The first input connector 412a may be coupled, for example, to the first input harness connector 434a. In some embodiments, the first input harness connector 434a may be configured to match (e.g., comprise the same type and/or configuration of connector as) the first processor connection port 410a which may, for example, be the standard location where the first input connector 412a is coupled (e.g., in the case that a machine housing and/or otherwise associated with the system 400 exists in a standard configuration in the absence of the retrofit device 420). In some embodiments, the second input harness connector 434b may be coupled to the second primary input connector 432b of the primary input cable 432 which in turn may be coupled to the input port 430 of the retrofit device 420 via the first primary input connector 432a. In such a manner, for example, input received from the input device 412 may be obtained by the retrofit device 420.

In some embodiments, the first primary input connector 432b, second primary input connector 432b, and second input harness connector 434b may be standardized such that the primary input cable 432 may comprise a standardized cable capable of being utilized to facilitate the retrofitting of any make or model of standard machine. Similarly, the third input harness connector 434c, which may be coupled to the first processor connection port 410a, may be configured to be the same type of connector as the first input connector 412a (e.g., the connector that would typically and/or otherwise be connected to the first processor connection port 410a). In such a manner, for example, the retrofit device 420 may be installed in any type or configuration of machine utilizing a standardized primary input cable 432 combined with a machine, make, model, and/or otherwise specific input harness 434.

According to some embodiments, the input received via the input port 430 and/or input signals generated by the retrofit device 420 and/or transmitted through the input port 430 may be routed through the input mapping connector 436. The input mapping connector 436 may, for example, comprise (and/or be in communication with, such as in the case that an object such as the personality board 336 of FIG. 3 is coupled thereto) specific electrical traces mapping incoming input traces (e.g., traces and/or wires carrying data from the input device 412) of the primary input cable 432 to outgoing input traces (e.g., traces and/or wires carrying data to the processing device 410) of the primary input cable 432. In such a manner, for example, the input mapping connector 436 may be specialized for any particular machine, without requiring the retrofit device 420 to be otherwise specialized. As described herein, the reduction of the need for specialized components decreases the cost of retrofitting existing machines and according promotes increased occurrences of such retrofitting.

In some embodiments, the first data management port 440 may be coupled, via the data management cable 442, to obtain, receive, transmit, and/or exchange machine data with the processing device 410. The first data management connector 442a may be coupled to the first data management port 440, for example, and the second data management connector 442b may be coupled to the second processor communication port 410b. In some embodiments, the first data management port 440, the first data management connector 442a, the second data management connector 442b, and/or the second processor communication port 410b may comprise connections configured in accordance with and/or configured to facilitate communications in accordance with the MDB protocol. The retrofit device 420 may, in some embodiments, utilize the first data management port 440 to query and/or poll the processing device 410 to obtain and/or derive data descriptive of the machine and/or products and/or services associated therewith.

According to some embodiments, the second data management port 444 may be coupled, via the data interface cable 446, to permit access, via the communication device 416, to data obtained and/or received by or via the first data management port 440. The first data interface connector 446a may be coupled to the second data management port 444, for example, and the second data interface connector 446b may be coupled to the communication device 416. In some embodiments, such as in the case that the communication device 416 comprises a DEX communication port, the second data management port 444 may be utilized to allow an operator and/or other user of a machine (e.g., a machine for which the processing device 410 provides computational and/or logic processing functionality) to interface with the processing device 410 to obtain machine data (e.g., in accordance with the DEX protocol).

In some embodiments, the payment port 450 may be coupled, via the payment cable 452, to the processing device 410 such that the retrofit device 420 is capable as function as and/or emulating a payment acceptance device for the machine. The first payment connector 452a may be coupled to the payment port 450, for example, and the second payment connector 452b may be coupled to the third processor communication port 410c. In some embodiments, the payment port 450 may be utilized to communicate with the processing device 410 via the MDB protocol. In such a manner, for example, the retrofit device 420 may satisfy payment requirements for desired products and/or services (e.g., for which pricing and/or other data is obtained via the first data management port 440; e.g., via the DEX protocol) by acting as and/or emulating a payment processing device. In some embodiments, such as in accordance with the MDB protocol, the retrofit device 420 may receive power (e.g., AC and/or DC power) via the payment port 450. In some embodiments, as described herein with respect to the MDB connector 350 and MDB cable 352 of the apparatus 320 of FIG. 3, the retrofit device 420 may utilize the payment port 450 to "ping" the processing device 410 (e.g., utilizing a small monetary amount such as a five cent ($0.05) "ping" to retrieve a deficiency amount or by utilizing a large monetary amount such as twenty dollars ($20) "ping" to retrieve an overpayment/change-due amount) to derive pricing data and then utilize the derived pricing data to transmit an indication of a proper payment/credit amount sufficient to cause a provision of a desired product and/or service.

According to some embodiments, such as in the case that the DEX-type communication device 416 is the only communication device 416 provided as standard equipment for the machine, the retrofit device 420 may comprise and/or utilize the retrofit communication device 460 (e.g., depicted in FIG. 4 for exemplary purposes as a wireless communication device). In the case that the standard machine does not comprise a device capable of and/or configured for external and/or remote communications, for example, the retrofit device 420 may comprise the retrofit communication device 460 as an upgrade in the communication functionality of the standard machine. In some embodiments, such as in the case that the machine comprises an external and/or remote communications device (not shown in FIG. 4), the retrofit communication device 460 may not be needed or desired or may function as a backup communication conduit (e.g., in the case that the standard communication device and/or associated network fails to function). According to some embodiments, the retrofit communication device 460 may be utilized to transmit and/or receive data indicative of machine inputs, such as described in conjunction with the procedures at 204 and/or 206 of the method 200 of FIG. 2 herein. The retrofit device 420 may, for example, receive indications of machine input via the retrofit communication device 460 (e.g., from a customer device and/or controller), map the input utilizing the input mapping connector 436, and/or transmit representative input signals to the processing device 410 (e.g., via the primary input cable 432 and the input harness 434).

In some embodiments, the retrofit device 420 may comprise and/or communicate with the retrofit processing device 474, via the retrofit processing port 470 and/or the processing cable 472. The retrofit processing device 474 may, for example, store instructions that are executed based on indications of input received from the input device 412, based on data received via the first data management port 440 (e.g., from the processing device 410), and/or based on indications and/or commands received via the retrofit communication device 460.

Figure 5:
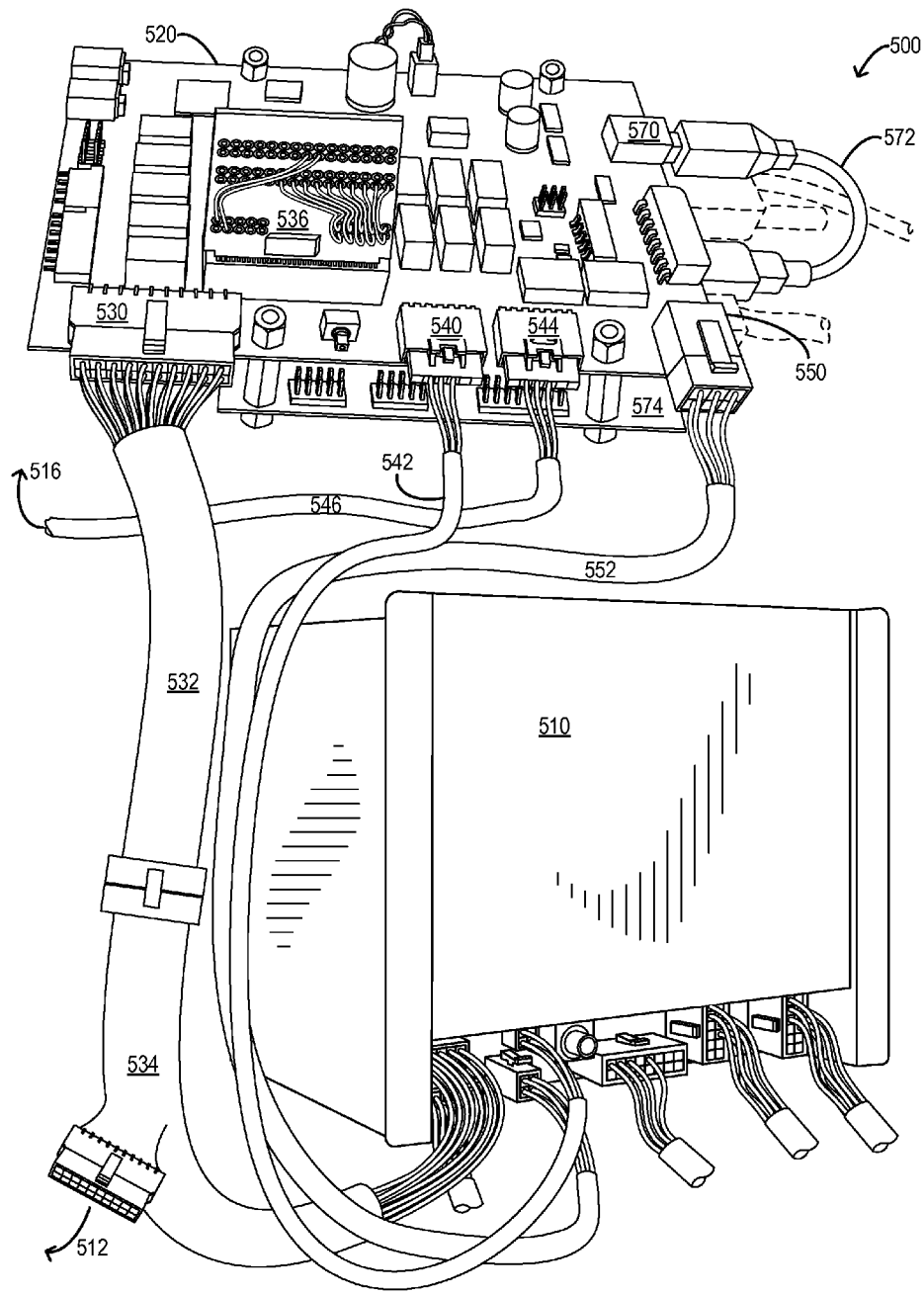
FIG. 5 is a perspective diagram of a system according to some embodiments.

Turning to FIG. 5, a perspective diagram of a system 500 according to some embodiments is shown. In some embodiments, the system 500 may be similar in configuration and/or functionality to the systems 100, 400 described in conjunction with FIG. 1 and/or FIG. 4 herein. The system 500 may, for example, execute, process, facilitate, and/or otherwise be associated with the method 200 of FIG. 2 herein. In some embodiments, the system 500 may comprise a processing device 510, a path to an input device 512, a path to a communication device 516, and/or a retrofit device 520. In some embodiments, the retrofit device 520 may comprise an input port 530 coupled to a primary input cable 532 and/or an input "Y" harness 534. In some embodiments, the retrofit device 520 may comprise an input mapping board 536 in communication with the input port 530. In some embodiments, the retrofit device 520 may comprise a first data management port 540 coupled to the processing device 510 via a data management cable 542 and/or a second data management port 544 coupled to the path to the communication device 516 via a data interface cable 546. According to some embodiments, the retrofit device 520 may comprise a payment port 550 coupled to the processing device 510 via a payment cable 552 and/or a retrofit processing port 570 coupled via a processing cable 572 to a retrofit processing device 574. In some embodiments, the components of the system 500 may be similar and/or equivalent to the similarly named and/or numbered components described with respect to the systems 100, 400 of FIG. 1 and/or FIG. 4 and/or the apparatus 320 of FIG. 3 herein. Fewer or more components and/or various configurations of the components 510, 512, 516, 520, 530, 532, 534, 536, 540, 542, 544, 546, 550, 552, 570, 572, 574 may be included in the system 500 without deviating from the scope of embodiments described herein.

According to some embodiments, the system of FIG. 5 may be representative of an application of the retrofit device 520 in a machine such as a vending machine or "smart" visi-cooler (e.g., a visi-cooler comprising a computational and/or logic device such as the processing device 510). The retrofit device 520 may, for example, allow increased and/or altered functionality to the machine with few required modifications. The retrofit device 520 may be mounted to the machine, in some embodiments, and the following cable connection changes may be implemented: (i) the input harness 534 may be connected to the processing device 510 (e.g., in place of the original and/or standard connection of the path to the input device 512), (ii) the input harness 534 may be connected to the path to the input device 512 (e.g., which addresses the disconnection of the path to the input device 512 from the processing device 510), (iii) the input harness 534 may be connected to the primary input cable 532, (iv) the primary input cable 532 may be connected to the input port 530 of the retrofit device 520, (v) the data management cable 542 may be connected to the processing device 510 (e.g., in place of the original and/or standard connection to the path to the communication device 516), (vi) the data management cable 542 may be connected to the first data management port 540 of the retrofit device 520, (vii) the data interface cable 546 may be connected to the path to the communication device 516 (e.g., which addresses the disconnection of the path to the communication device 516 from the processing device 510), (viii) the data interface cable 546 may be connected to the second data management port 544 of the retrofit device 520, and/or (ix) the payment cable 552 may be connected between the payment port 550 and the processing device 510.

In some embodiments, the retrofitting of the machine may be quickly and easily accomplished by simply rerouting and/or changing the connections of existing cables (e.g., as described above) and adding the retrofit device 520. In some embodiments, of the new equipment (e.g., new to the standard and/or typical machine—such as the retrofit device 520, the primary input cable 532, the input harness 534, the data management cable 542, and/or the payment cable 552) utilized to retrofit the machine, only the input harness 534 and/or the input mapping board 536 may be specialized, customized, specially configured, and/or "personalized" for the particular make, model, and/or configuration of the machine. In such a manner, the cost (e.g., in both terms of hardware and installation labor) of retrofitting the machine may be greatly reduced.

IV. Interactive Soda Fountains

A. Introduction

Figure 6:
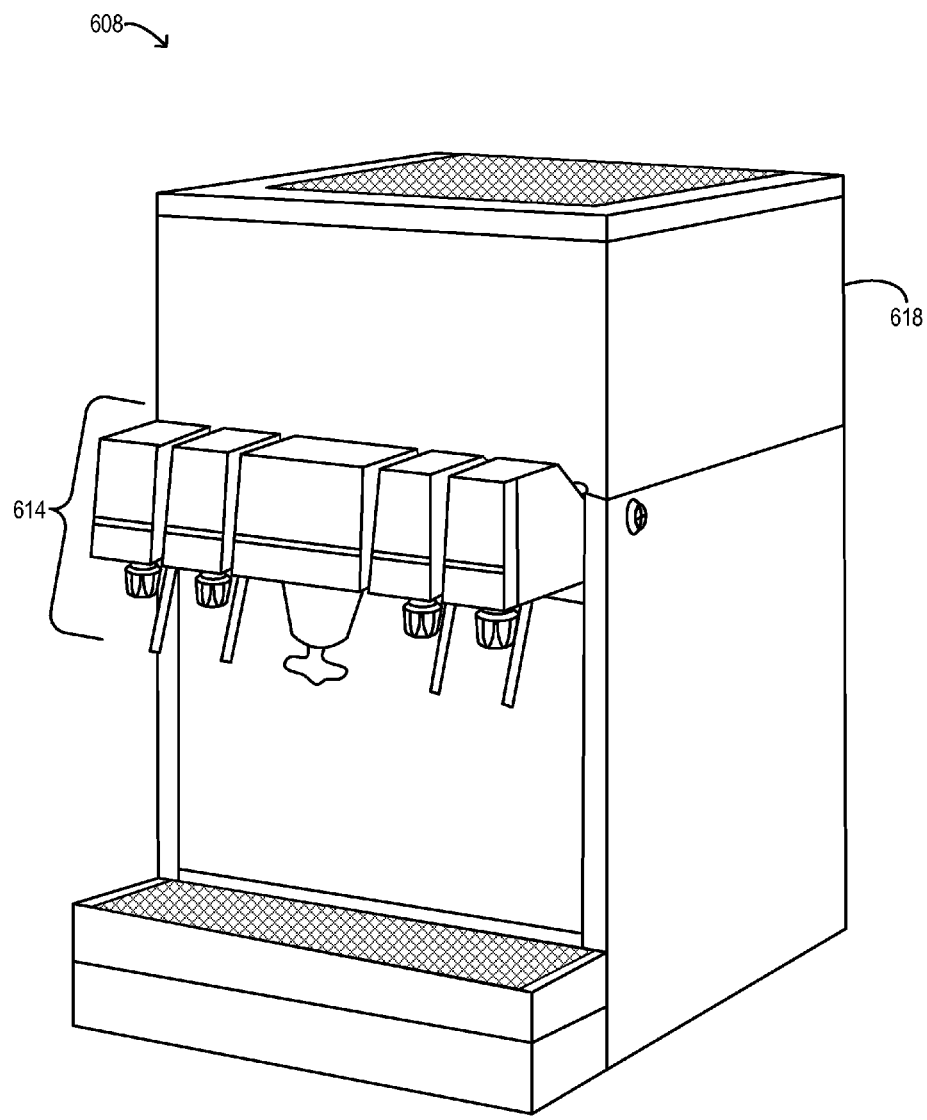
FIG. 6 is a perspective diagram of a prior art soda fountain.

Referring now to FIG. 6, a perspective diagram of a prior art soda fountain 608 is shown. The soda fountain 608 may comprise a plurality of function devices 614 such as the depicted fountain heads and ice dispenser. The plurality of function devices 614 may be coupled to a cabinet 618 that houses internal components (not shown in FIG. 6) that are coupled and/or configured to allow various flavors and/or mixes of beverages (e.g., carbonated and/or non-carbonated beverages) to be provided via the fountain head function devices 614, such as in the case that the depicted levers are depressed (e.g., by a portion of a cup (also not shown) placed beneath the fountain head function devices 614.

Devices such as the soda fountain 608 generally serve a particular function for restaurants and other establishments in which they are employed. They allow, for example, bulk purchase of syrup, on-site carbonation, on-site mixing or blending (which many consumers prefer to pre-bottled carbonated mixes), and customer-customized flavor mixes. These and other attributes of the soda fountain 608 promote decreased beverage operating costs (e.g., less packaging, less overall waste, less refrigeration, and less transportation), increased customer flexibility and satisfaction, and the ability of an establishment to push beverage fulfillment to customers (i.e., self-service) as opposed to requiring staff to manage the process. These benefits are available via the soda fountain 608 as a relatively low-cost and simple machine that does not require or utilize complex electronics, that does not require third-party stocking, and that can often be maintained and managed by on-site personnel.

B. Processes

Figure 7:
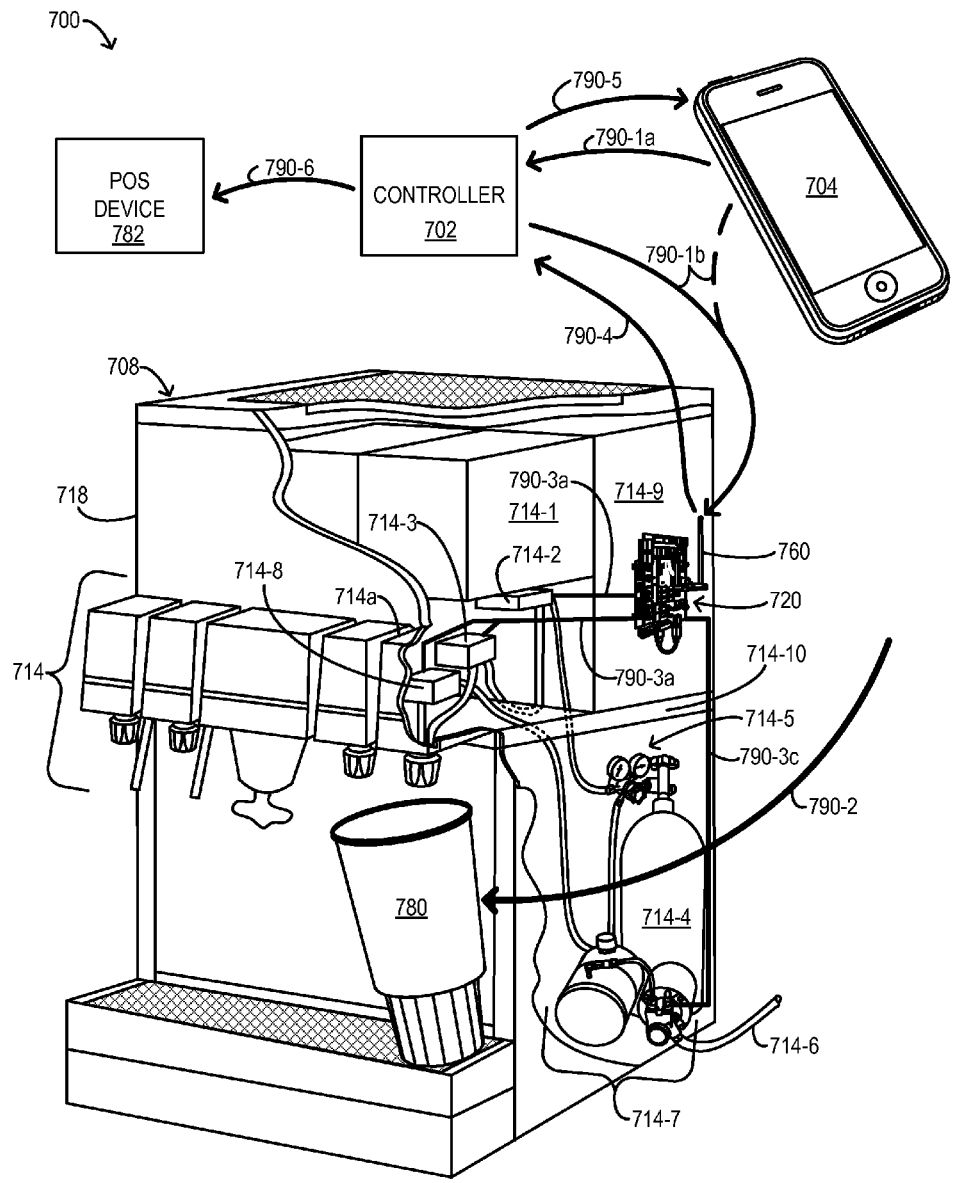
FIG. 7 is a functional perspective diagram of a process according to some embodiments.

Turning to FIG. 7, a functional perspective diagram of a process 700 according to some embodiments is shown. In some embodiments, the process 700 may be performed, facilitated, and/or implemented by and/or otherwise associated with one or more specialized computerized processing devices (e.g., the controller 102, mobile customer devices 104a-n, and/or retrofit device 120 of FIG. 1, the apparatus 320 of FIG. 3, and/or the retrofit devices 420, 520 and/or processing devices 410, 510 of FIG. 4 and/or FIG. 5 herein), specialized computers, computer terminals, computer servers, computer systems and/or networks, and/or any combinations thereof. In some embodiments, the process 700 may be related to and/or comprise methods of retrofitting machines and/or selling products and/or services via retrofitted machines such as described in conjunction with the method 200 of FIG. 2 herein. In some embodiments, the process 700 may be embodied in, facilitated by, and/or otherwise associated with various input mechanisms and/or interfaces as described herein. In some embodiments, the process 700 may implement and/or facilitate various Grab-n-Go™ interactive functionalities as described in conjunction with FIG. 5, FIG. 6, FIG. 7, and/or FIG. 8 of co-pending U.S. patent application Ser. No. 13/004,864 filed on Jan. 11, 2011 in the name of Breitenbach et al. and titled "SMART VISI-COOLERS", such concepts of which are hereby incorporated herein by reference.

According to some embodiments, the process 700 may comprise various procedures performed in association with a controller 702, a customer device 704, and/or a soda fountain 708. In some embodiments the soda fountain 708 may comprise a plurality of function devices 714 such as a first fountain head 714a, syrup containers 714-1, a syrup motor 714-2, a syrup solenoid 714-3, a carbon dioxide tank 714-4, a carbon dioxide regulator 714-5, a fresh water supply 714-6, a carbonator device 714-7, a carbonated water (i.e., soda and/or seltzer water) solenoid 714-8, and ice bin 714-9, and/or a cold plate 714-10. In some embodiments, the soda fountain 708 may comprise a cabinet 718 and/or a retrofit device 720. The retrofit device 720 may, according to some embodiments, transform the soda fountain 708 into an "interactive" soda fountain 708, as described in more detail hereinafter. In some embodiments, the retrofit device 720 may comprise a retrofit communication module 760. According to some embodiments, the process 700 may comprise various procedures performed in association with a beverage cup 780 and/or a Point-Of-Sale (POS) device 782.

According to some embodiments, fewer or more components 702, 704, 708, 714, 718, 720, 760, 780, 782 and/or various configurations of the depicted components 702, 704, 708, 714, 718, 720, 760, 780, 782 may be included in execution of the process 700 without deviating from the scope of embodiments described herein. In some embodiments, the components 702, 704, 708, 714, 718, 720, 760 may be similar in configuration and/or functionality to similarly named and/or numbered components as described with reference to the systems 100, 400, 500 of FIG. 1, FIG. 4, and/or FIG. 5, the method 200 of FIG. 2, and/or the apparatus 320 of FIG. 3 herein.

In some embodiments, the process 700 may comprise a transmission sent from the customer device 704 and received by the controller 702, at 790-1a. A customer utilizing the customer device 704 may, for example, utilize communication functionality such as Bluetooth®, IR, RF, and/or Wi-Fi® and/or may utilize an application such as an iPhone® and/or Android® application obtained from an online marketplace of available applications, to communicate a desire to purchase an amount of beverage from and/or otherwise interact with the interactive soda fountain 708. In some embodiments, the customer device 704 may transmit and the controller 702 may receive an indication of an order or purchase request to be fulfilled by the interactive fountain 708.

According to some embodiments, a transmission including an indication of the transmission at 790-1a may be sent from the controller 702 (and/or the customer device 704) to the retrofit communication module 760, at 790-1b. In some embodiments, such as in the case that the customer device 704 is configured for direct communication with the interactive soda fountain 708 (and/or vice versa), the transmission at 790-1b may take the place of the transmission at 790-1a and/or the controller 702 may not be necessary for the implementation of the process 700. In some embodiments, the transmission at 790-1b may comprise an indication and/or a command operative to cause the retrofit device 720 to execute stored instructions, process and/or gather or transmit data, and/or otherwise cause a desired action thereof. In the case that the transmission at 790-1b comprises an indication of a desired transaction such as the purchase of a certain quantity and/or type of beverage available via the interactive fountain 708, for example, the retrofit device 720 may cause, in response to the indication, the interactive fountain 708 to operate in accordance with the desired transaction (e.g., provide the desired product).

In some embodiments, such as in the case that the customer device 704 is utilized to purchase a beverage from the interactive fountain 708, the customer may place the beverage cup 780 underneath the first fountain head 714a—e.g., to put the beverage cup in position to receive the desired beverage, at 790-2. In some embodiments, such as in response to the transmission at 790-1b, and/or after or in response to the placing of the beverage cup 780 at 790-2, the retrofit device 720 may transmit and the solenoids 714-3, 714-8 may receive an indication to activate product flow in the first fountain head 714a, at 790-3a. The indication received by the solenoids 714-3, 714-8 (and/or by either the syrup solenoid 714-3 or the carbonated water solenoid 714-8, as is appropriate for the desired beverage) may, for example, cause the desired beverage to be dispensed into the beverage cup 780. According to some embodiments, since the dispensing of the beverage in the process 700 is initiated by a device (e.g., the customer device 704) other than the beverage cup 780 (e.g., being placed in position, which is the standard mechanism by which a fountain head 714 and the respective solenoids 714-3, 714-8 are activated), the retrofit device 720 and/or the interactive fountain 708 may be configured to sense the appropriate placement of the beverage cup 780 prior to initiating the transmission at 790-3a (e.g., to ensure that the desired beverage is dispensed into an appropriate container instead of onto the floor). While not explicitly shown in FIG. 7, such sensing may be conducted by any type, quantity, and/or configuration of sensor that is or becomes known or desirable such as a photo or other optical sensor and/or a pressure sensor.

In some embodiments, such as in the case that the solenoids 714-3, 714-8 are not configured to activate all requisite components for dispensing the desired beverage and/or in the case that direct control and/or setting or adjustments are desired for other components, the retrofit device 720 may send other transmissions to activate other components of the interactive fountain 708. The retrofit device 720 may transmit and the syrup pump 714-2 may receive, for example, a signal indicating desired activation and/or a desired setting for the syrup pump 714-2, at 790-3b. Similarly, the retrofit device 720 may transmit and the carbonator 714-7 may receive, for example, a signal indicating desired activation and/or a desired setting for the carbonator 714-7, at 790-3c. According to some embodiments, the retrofit device 720 may be utilized to remotely and/or dynamically set or alter the mixture of syrup and carbonated water to set and/or alter the taste of the desired beverage. The customer operating the customer device 704 may, for example, utilize an interface of an application running on (or at least partially on) the customer device 704 to select a desired syrup to carbonated water ratio that will be applied when the interactive fountain 708 dispenses the desired beverage into the beverage cup 780.

According to some embodiments, the retrofit device 720 and/or the retrofit communication module 760 thereof may transmit and the controller 702 (and/or the customer device 704) may receive, information descriptive of various parameters and/or metrics associated with the interactive soda fountain 708, at 790-4. The transmission at 790-4 may comprise, for example, a confirmation of the dispensing of the desired beverage, sales data associated with the transaction conducted in accordance with the process 700, sales data from other transactions, inventory levels of syrup, carbon dioxide, and/or ice, and/or settings and/or maintenance conditions or diagnostics of the interactive soda fountain 708 (and/or components thereof). In some embodiments, such as in the case that the transmission at 790-4 is not directed to the customer device 704, the controller 702 may transmit and the customer device 704 may receive, an indication of the transaction such as a confirmation of the dispensing of the desired product, a transaction receipt, and/or another indication that the customer has properly acquired the desired beverage (e.g., and is accordingly permitted to leave an associated restaurant establishment with the filled beverage cup 780), at 790-5.

In some embodiments, the process 700 may comprise a transmission from the controller 702 and a receipt by the POS device 782, of an indication of data descriptive of the transaction and/or descriptive of the interactive soda fountain 708, at 790-6. In such a manner, for example, a purchase transaction at the interactive soda fountain 708 may be conducted without requiring interaction with and/or utilization of the POS device 782 (e.g., likely decreasing lines at the restaurant and/or otherwise increasing efficiencies and/or reducing transaction costs). In some embodiments, the transmission at 790-6 may include an indication that the customer has purchased and/or is otherwise entitled to the desired beverage dispensed into the beverage cup 780, such that the restaurant staff is made aware of the transaction conducted via the process 700. According to some embodiments (such as depicted in FIG. 7), the interactive soda fountain 708 may be configured to provide fountain heads 714 that are capable of dispensing beverages in a standard fashion (e.g., the two (2) left-most fountain heads 714 depicted with cup-placement solenoid activation levers) as well as fountain heads 714 that are only capable of dispensing beverages in response to signals associated with the retrofit device 720 (e.g., wireless and/or mobile beverage ordering via the customer device 704).

C. Methods

Figure 8:
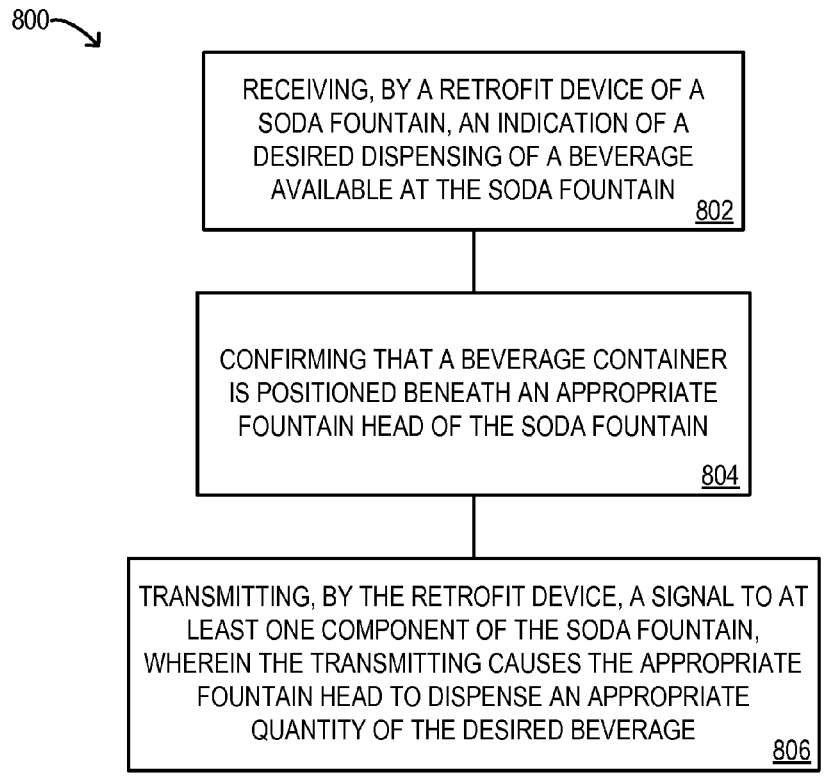
FIG. 8 is a flow diagram of a method according to some embodiments.

Turning to FIG. 8 a flow diagram of a method 800 according to some embodiments is shown. In some embodiments, the method 800 may be performed and/or implemented by and/or otherwise associated with one or more specialized computerized processing devices (e.g., the controller 102, mobile customer devices 104a-n, and/or retrofit device 120 of FIG. 1, the apparatus 320 of FIG. 3, and/or the retrofit devices 420, 520, 720 of FIG. 4, FIG. 5, and/or FIG. 7, and/or the processing devices 410, 510 of FIG. 4 and/or FIG. 5 herein), specialized computers, computer terminals, computer servers, computer systems and/or networks, and/or any combinations thereof. In some embodiments, the method 800 may be related to and/or comprise methods of retrofitting machines such as soda fountains and/or selling products and/or services via retrofitted machines such as described in conjunction with the process 700 of FIG. 7 herein. In some embodiments, the method 800 may be embodied in, facilitated by, and/or otherwise associated with various input mechanisms and/or interfaces as described herein.

In some embodiments, the method 800 may comprise receiving, by a retrofit device of a soda fountain and from at least one of a mobile customer device and a remote processing device, an indication of a desired dispensing of a beverage available at the soda fountain, at 802. While a standard soda fountain operates to dispense beverages upon triggering of a solenoid activation lever, for example, an "interactive" soda fountain (i.e., a soda fountain retrofitted as described herein) may also or alternatively permit beverage dispensing activation upon receipt of a signal (e.g., received via a network such as the network 106 of FIG. 1). In some embodiments, a customer device such as a PC, PDA, and/or smart phone may be utilized to place orders for beverages at the interactive (or "smart") soda fountain. An application operating on the customer device may transmit commands to the interactive soda fountain, for example, and/or the customer device may interface with a controller or server (e.g., the remote processing device) such as a web server that hosts a website configured to permit electronic ordering of beverages dispensed from the interactive soda fountain.

According to some embodiments, the method 800 may comprise confirming that a beverage container is positioned beneath an appropriate fountain head of the soda fountain, at 804. It may be desirable, for example, to ensure that any quantity of desired beverage dispensed form the interactive soda fountain be properly dispensed into a container, as opposed to being dispensed into a drain, onto the floor, and/or otherwise wasted. In some embodiments, the confirming may comprise receiving (e.g., via the retrofit device) a signal indicating that a cup is properly positioned. The customer may, after transmitting the request for the beverage, for example, be prompted to confirm placement of a beverage container beneath an appropriate fountain head of the interactive soda fountain via which the desired beverage will be dispensed. The customer may, in response to a prompt and/or otherwise, press a button, send a signal, and/or otherwise indicate to the remote electronic processing device (e.g., a server) and/or directly to the retrofit device of the interactive fountain that the container is ready for dispensing. In some embodiments, the interactive soda fountain and/or retrofit device may be outfitted with a sensor such as a photo and/or other optical sensor or a pressure sensor. The sensor may detect appropriate placement of the container and may send a signal indicative of the placement to the retrofit device (e.g., confirming the presence of the container/cup). In some embodiments, the sensor may simply comprise a traditional fountain head solenoid activation lever (e.g., the lever that cups are typically placed against to engage to initiate standard dispensing) re-wired to connect to the retrofit device instead of the solenoid(s). According to some embodiments, the solenoids(s) may be wired to engage only upon receiving appropriate signals (and/or detecting appropriate states) from both the traditional fountain head solenoid activation lever and the retrofit device (e.g., both an authorized purchase and a properly placed cup may be required to trigger beverage dispensing). In some embodiments, the authorized purchase signal and/or indication may comprise input received via a button or other interface of the interactive soda fountain that is descriptive of a traditional, manual, and/or otherwise "cash" purchase. Customers utilizing the interactive soda fountain in the traditional fashion, for example, may approach the machine and press a "cash" purchase button that authorizes dispensing (e.g., in conjunction with the solenoid activation lever). Reconciliation of the purchase may then take place at the POS of the establishment as is typical. In some embodiments, such as in the case that the "cash" transaction (e.g., a transaction conducted in a manner other than via the retrofit device) occurs prior to the dispensing of the beverage, the machine may comprise a barcode scanner or other input device wherein a receipt for the purchase is operable to activate the desired fountain head (e.g., in conjunction with the solenoid activation lever).

In some embodiments, such as in the case that refills are managed by the interactive fountain, the sensor may also or alternatively be capable of identifying a specific container (such as by scanning a barcode or other computer-readable indicia and/or via RF Identification (RFID)). Refills of a container that has already received a dispensing of a beverage may, for example, automatically be tracked and/or allowed upon subsequent identification of the same container properly placed under a fountain head of the interactive fountain. In such a manner, for example, the interactive fountain may automatically charge a repeat customer either for a refill or for a subsequent transaction. In the case that an establishment provides free refills, only those containers having previously been utilized to conduct a purchase (e.g., ever, or during a certain time period such as within the last hour) may be authorized to receive subsequent dispensing without requiring further payment authorization. In some embodiments, such as in the case that a customer has requested and is authorized to receive a certain amount of a beverage, the retrofit device may track the actual amount of beverage dispensed. In such a manner, for example, if a malfunction and/or other situation causes the customer to only partially dispense the beverage (e.g., the customer may only desire a portion of the beverage now and may wish to return for the remainder at some later time), upon return of the same container to the interactive fountain, the remainder of the beverage may be dispensed without requiring further payment. While embodiments are described with respect to identifying the container utilized, it is also contemplated that the customer device itself may also or alternatively be identified and utilized to determine a returning customer and/or identify a partial purchase fulfillment.

According to some embodiments, the method 800 may comprise transmitting (e.g., by the retrofit device) a signal to at least one component of the soda fountain, wherein the transmitting causes the appropriate fountain head to dispense an appropriate quantity of the desired beverage, at 806. After the confirming at 804 and/or in response to the receiving at 802, for example, the retrofit device may activate appropriate interactive fountain components to cause a dispensing of the desired beverage (e.g., in the desired amount and/or with the desired mix of flavors, syrup, and/or carbonated water). The retrofit device may be coupled to send a signal to fountain head solenoids (e.g., the solenoids 714-3, 714-8 of FIG. 7 herein), for example, triggering a dispensing as desired. In some embodiments, such as in the case that custom and/or personalized (e.g., based on stored customer account parameters or preferences) beverage mixes are desired, the retrofit device may send signals activating and/or setting other components such as syrup pumps, carbon dioxide regulators, and/or carbonator devices to achieve the desired beverage characteristics. In some embodiments, the transmitting may also comprise disabling one or more of the other fountain heads of the interactive soda fountain (e.g., during the remote/electronic purchase transaction).

According to some embodiments, the interactive fountain may utilize the retrofit device to enhance profitability and/or other efficiencies. The retrofit device may be coupled to monitor and/or report (e.g., to the remote electronic processing device) sales and/or dispensing or other machine data, for example, such as amount and type of product dispensed, temperatures of product storage areas, number and/or type of transactions (e.g., manual and/or traditional dispensing transactions compared to electronic transactions via the retrofit device), carbon dioxide pressure levels, pressure and/or other settings, fresh water volume and/or flow rates, and/or electricity usage. The stored, tracked, and/or reported data may, in some embodiments, be utilized by the controller and/or by an establishment in which the interactive fountain resides (e.g., by a POS system thereof) to perform revenue management, restocking, and/or marketing analysis based on products sold via the interactive fountain.

In some embodiments, the interactive fountain may be capable of interacting with customer devices (e.g., directly and/or via a central and/or remote controller device) in a variety of other novel and useful ways. The interactive fountain, via the retrofit device, may detect a customer's presence near the interactive fountain and push advertisements, promotions, and/or offers to a device associated with the nearby customer. The retrofit device may, for example, automatically activate an interactive fountain application on the customers smart phone or tablet computer, via which the customer may order (and cause to be dispensed) drinks from the interactive fountain. In some embodiments, an instant-win game and/or competitive game may be played by the customer, via the retrofit device of the interactive fountain. The customer may be presented with an instant win game via their mobile device upon entering an establishment, for example, and may redeem a prize won via the establishment and/or the interactive fountain. Upon winning a game, for example, the interactive fountain may automatically allow the customer to dispense the appropriate prize. Similarly, competitive games against other competitors may be managed and/or facilitated by the retrofit device, with winners being provided prizes via the interactive fountain (and/or via a POS device of the establishment). Codes descriptive of a winning event may be provided to the customer's device and may be operable to cause the interactive fountain (e.g., upon input thereof) and/or the POS system to provide a prize to the customer. In some embodiments, a "leader board" of winning patrons may be displayed, such as on or by the interactive fountain and/or via the mobile device application associated therewith. According to some embodiments, game results and/or other information associated with a customer may be posted to one or more social networking sites and/or accounts associated with the customer (e.g., a message or posting announcing that the customer has just won a free soda fountain beverage at a particular establishment may be automatically posted to a webpage and/or thread associate with the customer).

V. Apparatus

Figure 9:
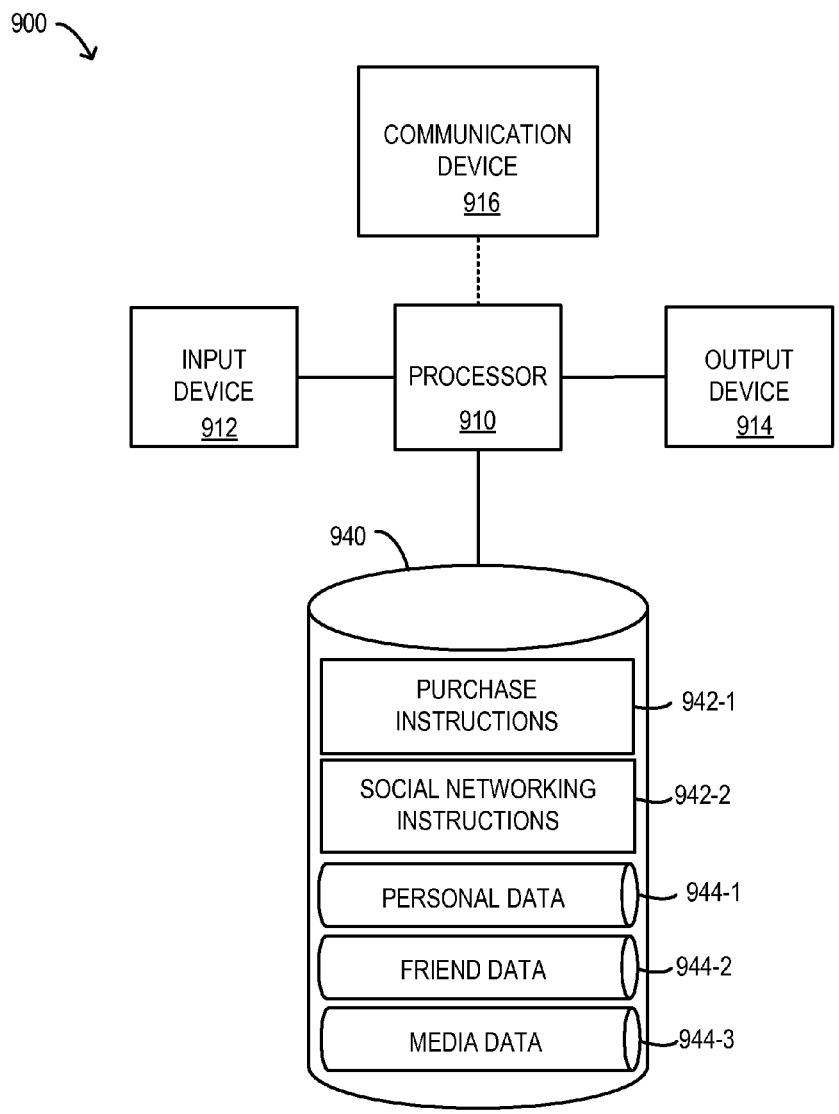
FIG. 9 is a block diagram of an apparatus according to some embodiments.

Turning to FIG. 9, a block diagram of an apparatus 900 according to some embodiments is shown. In some embodiments, the apparatus 900 may be similar in configuration and/or functionality to the controller 102, 702, the mobile customer devices 104a-n, 704, and/or retrofit device 120, 720 of FIG. 1 and/or FIG. 7, the apparatus 320 of FIG. 3, and/or the retrofit devices 420, 520, and/or the processing devices 410, 510 of FIG. 4 and/or FIG. 5 herein. The apparatus 900 may, for example, execute, process, facilitate, and/or otherwise be associated with the methods 200, 300, 800 of FIG. 2, FIG. 3, and/or FIG. 8 and/or with the process 700 of FIG. 7 herein. In some embodiments, the apparatus 900 may comprise a processor 910, an input device 912, an output device 914, a communication device 916, and/or a memory device 940. Fewer or more components and/or various configurations of the components 910, 912, 914, 916 may be included in the apparatus 900 without deviating from the scope of embodiments described herein. In some embodiments, the components 910, 912, 914, 916 of the apparatus 900 may be similar and/or equivalent to the similarly named and/or numbered components described with respect to the systems 100, 400, 500 of FIG. 1, FIG. 4, and/or FIG. 5, the apparatus 320 of FIG. 3, and/or the process 700 of FIG. 7 herein.

According to some embodiments, the processor 910 may be or include any type, quantity, and/or configuration of electronic and/or computerized processor that is or becomes known. The processor 910 may comprise, for example, an Intel® IXP 2800 network processor or an Intel® XEON™ Processor coupled with an Intel® E7501 chipset, available from Intel® Corporation of Santa Clara, Calif. In some embodiments, the processor 910 may comprise an electronic processor such as an Intel® Core™ 2 Duo P8600 CPU also available from Intel® Corporation of Santa Clara, Calif. In some embodiments, the processor 910 may execute instructions, such as instructions specially programmed into and/or for the processor 910. The execution of the specially-programmed instructions may, for example, enable and/or facilitate the apparatus 900 to operate in accordance with embodiments as described herein.

In some embodiments, the processor 910 may comprise multiple inter-connected processors, microprocessors, and/or micro-engines. According to some embodiments, the processor 910 (and/or the apparatus 900 and/or other components thereof) may be supplied power via a power supply (not shown) such as a battery, an AC source, a DC source, an AC/DC adapter, solar cells, and/or an inertial generator. In the case that the apparatus 900 comprises a server such as a blade server, necessary power may be supplied via a standard AC outlet, power strip, surge protector, and/or UPS device.

In some embodiments, the input device 912 and/or the output device 914 are communicatively coupled to the processor 910 (e.g., via wired and/or wireless connections, traces, and/or pathways) and they may generally comprise any types or configurations of input and output components and/or devices that are or become known, respectively. The input device 912 may comprise, for example, a keyboard that allows an operator and/or customer of the apparatus 900 to interface with the apparatus 900 (e.g., by an operator of a mobile computing device, such as to implement and/or interact with embodiments herein to purchase products at machines and/or to otherwise induce functionality at and/or by such machines). The output device 914 may, according to some embodiments, comprise a display screen and/or other practicable output component and/or device. The output device 914 may, for example, provide information, data, and/or images that permit a customer to purchase products and/or may comprise a dispensing device and/or other component that provides output and/or other functionality at a machine such as a vending machine, visi-cooler, and/or soda fountain. According to some embodiments, the input device 912 and/or the output device 914 may comprise and/or be embodied in a single device such as a touch-screen monitor.

In some embodiments, the communication device 916 may comprise any type or configuration of communication device that is or becomes known or practicable. The communication device 916 may, for example, comprise a NIC, a telephonic device, a cellular network device, a router, a hub, a modem, and/or a communications port or cable. In some embodiments, the communication device 916 may be coupled to provide data to a central controller and/or to mobile customer devices, such as in the case that the apparatus 900 is utilized by a customer to purchase products and/or conduct social networking via a customer's wireless and/or mobile device. According to some embodiments, the communication device 916 may also or alternatively be coupled to the processor 910. In some embodiments, the communication device 916 may comprise an IR, RF, Bluetooth™, and/or Wi-Fi® network device coupled to facilitate communications between the processor 910 (and/or the apparatus 900) and/or between a retrofit device (not shown in FIG. 9) and another external and/or remote device (such as the controller 102, 702 and/or the customer devices 104a-n, 704 of FIG. 1 and/or FIG. 7 herein).

The memory device 940 may comprise any appropriate information storage device that is or becomes known or available, including, but not limited to, units and/or combinations of magnetic storage devices (e.g., a hard disk drive), optical storage devices, and/or semiconductor memory devices such as RAM devices, ROM devices, SDR-RAM, Double DDR-RAM, and/or PROM. The memory device 940 may, according to some embodiments, store one or more of purchase instructions 942-1 and/or social networking instructions 942-2. In some embodiments, the purchase instructions 942-1 and/or social networking instructions 942-2 may be utilized by the processor 910 to provide output information via the output device 914 and/or the communication device 916 (e.g., the transmitting at 204 and/or 806 and/or the causing at 208 of the methods 200, 800 of FIG. 2 and/or FIG. 8 herein).

According to some embodiments, the purchase instructions 942-1 may be operable to cause the processor 910 to access and/or process personal data 944-1. Personal data 944-1 received via the input device 912 and/or the communication device 916 may, for example, be analyzed, sorted, filtered, decoded, decompressed, ranked, scored, plotted, and/or otherwise processed by the processor 910 in accordance with the purchase instructions 942-1. In some embodiments, personal data 944-1 may be utilized by the processor 910 to facilitate and/or conduct processes and/or methods in accordance with the purchase instructions 942-1 to facilitate and/or effectuate a customer's purchase of products and/or services from (or via) a machine as described herein. The purchase instructions 942-1 may, in some embodiments, interface with an application stored on and/or executed by a customer's mobile phone, for example, to facilitate the purchase and/or dispensing of refreshments from vending machines, visi-coolers, and/or soda fountains as described herein.

According to some embodiments, the social networking instructions 942-2 may be operable to cause the processor 910 to access and/or process one or more of the personal data 944-1, friend data 944-2, and/or media data 944-3. Personal data 944-1, friend data 944-2, and/or media data 944-3 received via the input device 912 and/or the communication device 916 may, for example, be analyzed, sorted, filtered, decoded, decompressed, ranked, scored, plotted, and/or otherwise processed by the processor 910 in accordance with the social networking instructions 942-2. In some embodiments, personal data 944-1, friend data 944-2, and/or media data 944-3 may be utilized by the processor 910 to facilitate and/or conduct processes and/or methods in accordance with the social networking instructions 942-2 to facilitate, manage, and/or route or otherwise process communications between and/or amongst customers as described herein. The social networking instructions 942-2 may, in some embodiments, interface with an application stored on and/or executed by a customer's mobile phone, for example, to facilitate networking between the customer and other customers.

In some embodiments, the personal data 944-1 may comprise any data descriptive of an attribute or characteristic of a customer. Personal data 944-1 may be acquired during a registration processes (e.g., from the customer), for example, and may comprise identifying information such as address, name, e-mail address, preferences, payment accounts and/or information, passwords, etc. In some embodiments, the personal data 944-1 may comprise data descriptive of the customer that is acquired via transactions conducted with the customer. Personal data 944-1 may comprise, for example, customer preferences (empirical and/or explicit—e.g., the customer has requested soda fountain beverages to contain fifty percent (50%) soda water), sales history, customer "worth" (e.g., expected value), frequency of purchases, and/ or previous or typical ordering locations. In some embodiments, personal data 944-1 may comprise information descriptive of social networking sites, accounts, profiles, activity, and/or preferences associated with the customer.

According to some embodiments, the friend data 944-2 may comprise data descriptive of social networking "friends" of the customer. Such "friends" may, for example, comprise people (and/or customers) with profiles and/or accounts that are related to the customer's profile and/or account at a social networking website. The friend data 944-2 may, in some embodiments, comprise data descriptive of an attribute or characteristic of a friend of the customer. According to some embodiments, the friend data 944-2 may be similar in compilation to the personal data 944-1, except that it is descriptive of a characteristic associated with friends of the customer instead of the customer themselves. In some embodiments, friend data 944-2 may be pulled (e.g., harvested) and/or acquired from one or more social networking sites and/or databases associated with the customer.

In some embodiments, the media data 944-3 may comprise information descriptive of media captured and/or recorder by and/or selected by the customer. The media data 944-3 may, for example, comprise information descriptive of and/or defining one or more pictures, sounds, video segments, graphics, logos, and/or other media that the customer provides via the apparatus 900. According to some embodiments, the media data 944-3 may be input and/or recorded by the input device 912 (e.g., a still and/or video camera). In some embodiments, the media data 944-3 may be utilized to in association with and/or be descriptive of one or more games played by the customer (e.g., instant-win and/or competitive games as described herein).

While the apparatus 900 is described with reference to specific quantities and types of components 910, 912, 914, 916, 940, variations in the quantities, types, and/or configurations of the components 910, 912, 914, 916, 940 of the apparatus 900 may be implemented without deviating from the scope of the embodiments described herein.

Any or all of the exemplary instructions and data types described herein and other practicable types of data may be stored in any number, type, and/or configuration of memory device 940 that is or becomes known. The memory device 940 may, for example, comprise one or more data tables or files, databases, table spaces, registers, and/or other storage structures. In some embodiments, multiple databases and/or storage structures (and/or multiple memory devices 940) may be utilized to store information associated with the apparatus 900. According to some embodiments, the memory device 940 may be incorporated into and/or otherwise coupled to the apparatus 900 (e.g., as shown) or may simply be accessible to the apparatus 900 (e.g., externally located and/or situated).

VI. Articles of Manufacture

Figure 10A:
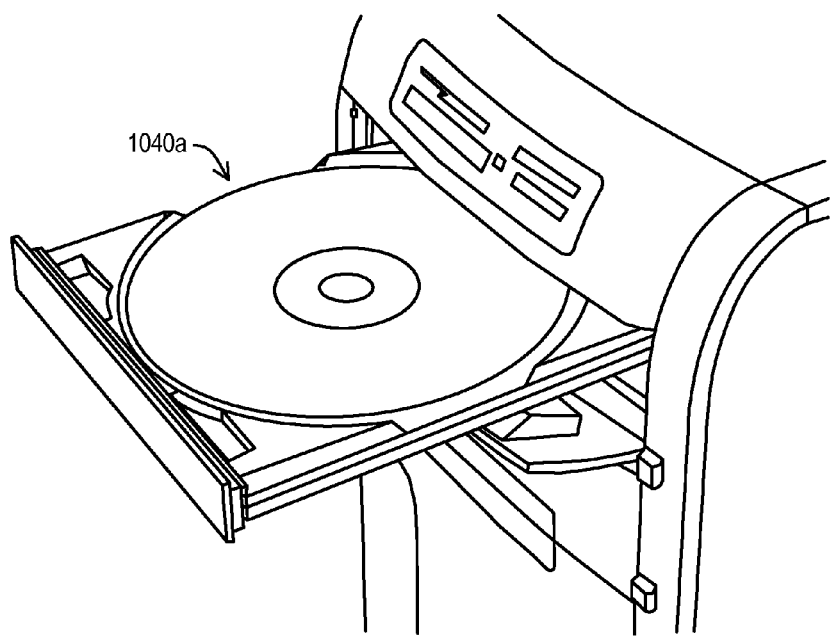
FIG. 10A and FIG. 10B are perspective diagrams of exemplary data storage devices according to some embodiments.
Figure 10B:
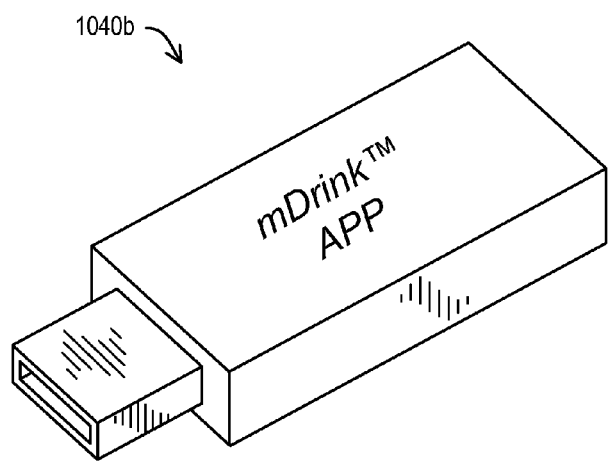

Referring to FIG. 10A and FIG. 10B, perspective diagrams of exemplary data storage devices 1040a-b according to some embodiments are shown. The data storage devices 1040a-b may, for example, be utilized to store instructions and/or data such as the purchase instructions 942-1, the social networking instructions 942-2, the personal data 944-1, the friend data 944-2, and/or the media data 944-3 as described in reference to FIG. 9 herein. In some embodiments, instructions stored on the data storage devices 1040a-b may, when executed by a processor (such as the controller 102, mobile customer devices 104a-n, and/or retrofit device 120 of FIG. 1, the apparatus 320 of FIG. 3, and/or the retrofit devices 420, 520, 720 of FIG. 4, FIG. 5, and/or FIG. 7, and/or the processing devices 410, 510 of FIG. 4 and/or FIG. 5 herein), cause the implementation of and/or facilitate any of the various methods 200, 800 of FIG. 2 and/or FIG. 8 and/or the process 700 of FIG. 7, described herein.

According to some embodiments, the first data storage device 1040a may comprise a CD, CD-ROM, DVD, Blu-Ray™ Disc, and/or other type of optically-encoded disk and/ or other computer-readable storage medium that is or becomes know or practicable. In some embodiments, the second data storage device 1040b may comprise a USB keyfob, dongle, and/or other type of flash memory data storage device that is or becomes know or practicable. The data storage devices 1040a-b may generally store program instructions, code, and/or modules that, when executed by an electronic and/or computerized processing device cause a particular machine to function in accordance with embodiments described herein. In some embodiments, the data storage devices 1040a-b depicted in FIG. 10A and FIG. 10B are representative of a class and/or subset of computer-readable media that are defined herein as "computer-readable memory" (e.g., memory devices as opposed to transmission devices). While computer-readable media may include transitory media types, as utilized herein, the term computer-readable memory is limited to non-transitory computer-readable media. In some embodiments, the data storage devices 1040a-b depicted in FIG. 10A and FIG. 10B are representative of programs, instructions and/or data stored on one or more other types of computer-readable memory devices such as internal or external hard drives and/or flash memory.

VII. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A retrofit device coupled to a soda fountain, comprising:
an electronic processing device; and
a memory device in communication with the electronic processing device, the memory device storing specially-programmed instructions that when executed by the electronic processing device result in:
receiving, from at least one of a mobile customer device and a remote processing device, an indication of a desired dispensing of a beverage available at the soda fountain;
confirming that a beverage container is positioned beneath an appropriate fountain head of the soda fountain, the appropriate fountain head comprising one of a subset of fountain heads of the soda fountain that are configured to be unable to receive dispensing commands from a keypad input device of the soda fountain; and
transmitting, after the confirming and in response to the receiving, a signal to at least one component of the soda fountain, wherein the transmitting causes the appropriate fountain head to dispense an appropriate quantity of the desired beverage.

* * * * *